US011128245B2

(12) United States Patent
Umezu et al.

(10) Patent No.: US 11,128,245 B2
(45) Date of Patent: Sep. 21, 2021

(54) POWER SUPPLY SYSTEM

(71) Applicant: KAWASAKI JUKOGYO KABUSHIKI KAISHA, Kobe (JP)

(72) Inventors: Yusuke Umezu, Kakogawa (JP); Kazushige Sugimoto, Amagasaki (JP); Soichiro Bando, Kobe (JP); Naoki Yamaguchi, Akashi (JP); Kenichi Sakimoto, Akashi (JP); Kiyoshi Kimura, Ichinomiya (JP); Suguru Takayama, Kakamigahara (JP); Takato Uda, Kakamigahara (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/757,692

(22) PCT Filed: Oct. 16, 2018

(86) PCT No.: PCT/JP2018/038421
§ 371 (c)(1),
(2) Date: Apr. 20, 2020

(87) PCT Pub. No.: WO2019/078184
PCT Pub. Date: Apr. 25, 2019

(65) Prior Publication Data
US 2021/0203258 A1    Jul. 1, 2021

(30) Foreign Application Priority Data
Oct. 20, 2017   (JP) .............................. JP2017-203312

(51) Int. Cl.
*H02P 9/06*        (2006.01)
*H02J 3/48*        (2006.01)
(Continued)

(52) U.S. Cl.
CPC .................. *H02P 9/06* (2013.01); *H02J 1/12* (2013.01); *H02J 3/48* (2013.01); *B64D 47/00* (2013.01);
(Continued)

(58) Field of Classification Search
CPC ....... H02P 9/06; H02P 2101/30; B64D 47/00; B64D 2221/00; H02J 1/12; H02J 3/48; H02J 2310/44
(Continued)

(56) References Cited

U.S. PATENT DOCUMENTS 6,778,414 B2 * 8/2004 Chang ................... H02M 5/272
363/67
7,148,649 B2 * 12/2006 Ganev ....................... H02J 3/24
318/701

(Continued)

FOREIGN PATENT DOCUMENTS

JP      2012-525814 A    10/2012
JP      5580881 B2        8/2014

*Primary Examiner* — Pedro J Cuevas
(74) *Attorney, Agent, or Firm* — Oliff PLC

(57) ABSTRACT

At least one of a plurality of generators is a first generator configured such that a relationship of a generator output voltage with respect to a generator active power output from the generator to a corresponding first AC wiring portion has a predetermined first drooping characteristic. The control device is configured to generate a drive signal for a power conversion device by deciding a target value of a first control element such that a relationship of an AC wiring portion voltage with respect to a power conversion device active power output from the power conversion device to a first AC wiring portion corresponding to a first generator has a predetermined second drooping characteristic and correcting the target value of the first control element according to a DC voltage at a DC wiring portion.

7 Claims, 25 Drawing Sheets

(51) Int. Cl.
  *H02J 1/12* (2006.01)
  *H02P 101/30* (2015.01)
  *B64D 47/00* (2006.01)

(52) U.S. Cl.
  CPC ....... *B64D 2221/00* (2013.01); *H02J 2310/44* (2020.01); *H02P 2101/30* (2015.01)

(58) Field of Classification Search
  USPC .............................................. 290/7; 307/9.1
  See application file for complete search history.

(56) References Cited

U.S. PATENT DOCUMENTS

| | | | | |
|---|---|---|---|---|
| 7,619,327 | B2* | 11/2009 | Rozman | H02P 9/302 |
| | | | | 307/153 |
| 8,159,086 | B2 | 4/2012 | Karipides | |
| 8,698,444 | B2* | 4/2014 | Malkin | H02J 3/14 |
| | | | | 318/696 |
| 10,029,631 | B2* | 7/2018 | Iwashima | B64D 41/007 |
| 10,279,759 | B2* | 5/2019 | Iwashima | H02J 4/00 |
| 10,766,630 | B2* | 9/2020 | Iwashima | H02J 1/14 |
| 2004/0119454 | A1* | 6/2004 | Chang | H02J 4/00 |
| | | | | 323/284 |
| 2006/0061213 | A1* | 3/2006 | Michalko | H02J 4/00 |
| | | | | 307/9.1 |
| 2009/0008993 | A1* | 1/2009 | Rozman | H02J 4/00 |
| | | | | 307/16 |
| 2009/0108676 | A1* | 4/2009 | Algrain | H02J 3/46 |
| | | | | 307/73 |
| 2009/0127935 | A1* | 5/2009 | Hung | H02J 7/0031 |
| | | | | 307/80 |
| 2009/0289497 | A1* | 11/2009 | Ichikawa | H01M 10/63 |
| | | | | 307/9.1 |
| 2010/0193630 | A1* | 8/2010 | Duces | H02J 3/02 |
| | | | | 244/58 |
| 2010/0252691 | A1* | 10/2010 | Malkin | F16H 25/20 |
| | | | | 244/76 R |
| 2010/0270858 | A1* | 10/2010 | Foch | F02C 6/08 |
| | | | | 307/9.1 |
| 2011/0273012 | A1* | 11/2011 | Tardy | H02J 4/00 |
| | | | | 307/9.1 |
| 2012/0086266 | A1* | 4/2012 | Shipley | H02J 4/00 |
| | | | | 307/9.1 |
| 2012/0091967 | A1* | 4/2012 | Kawamoto | H02J 3/32 |
| | | | | 320/134 |
| 2012/0297108 | A1* | 11/2012 | Mitani | B64D 47/00 |
| | | | | 710/316 |
| 2014/0032002 | A1* | 1/2014 | Iwashima | B64D 41/007 |
| | | | | 700/295 |
| 2014/0197681 | A1* | 7/2014 | Iwashima | B60L 53/56 |
| | | | | 307/9.1 |
| 2015/0165990 | A1* | 6/2015 | Iwashima | H02J 4/00 |
| | | | | 307/9.1 |
| 2015/0183385 | A1* | 7/2015 | Iwashima | B60L 53/53 |
| | | | | 307/9.1 |
| 2015/0327340 | A1* | 11/2015 | Siessegger | H05B 45/375 |
| | | | | 315/200 R |
| 2018/0362181 | A1* | 12/2018 | Iwashima | H02M 7/12 |

* cited by examiner

[FIG. 1]
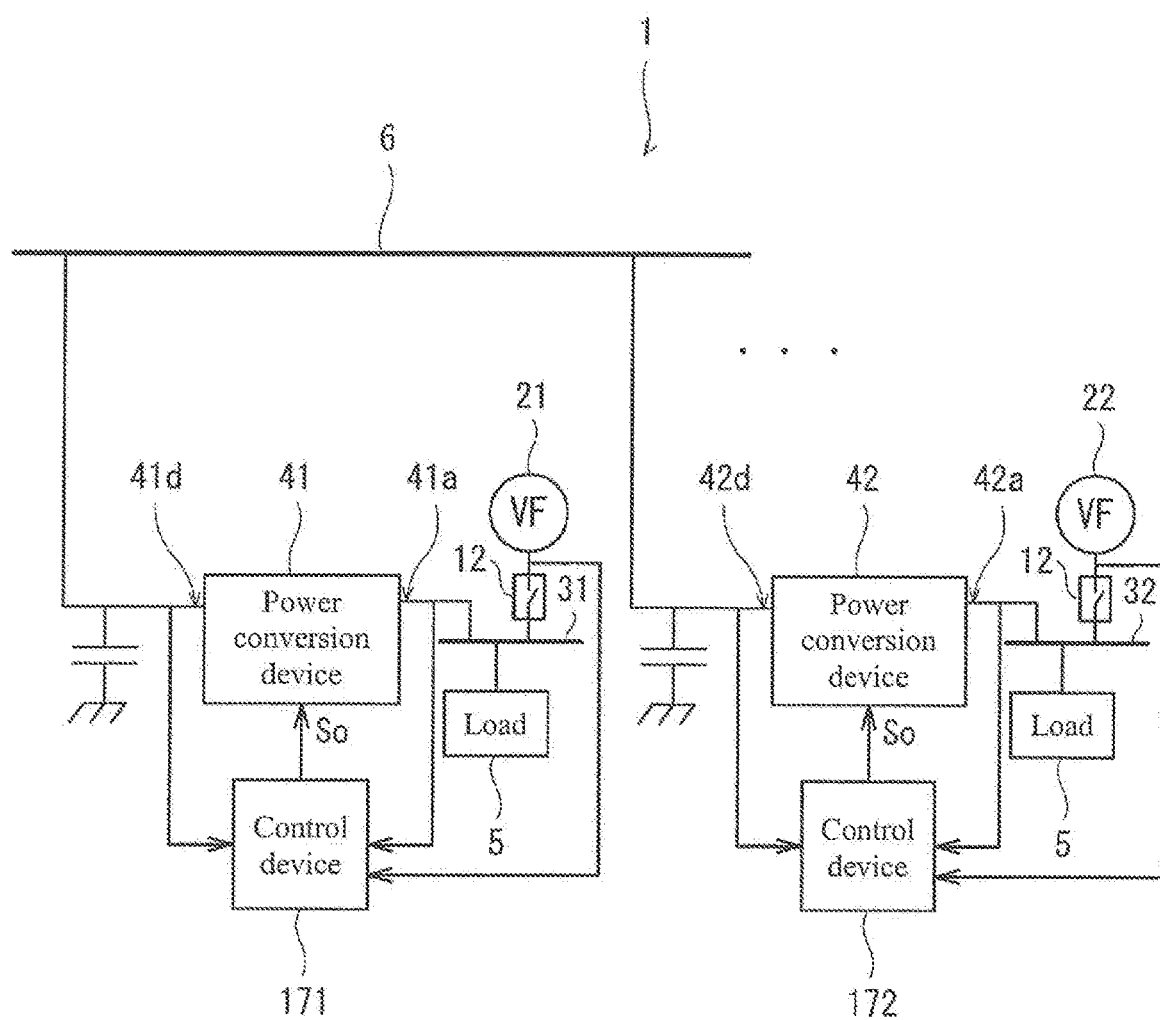

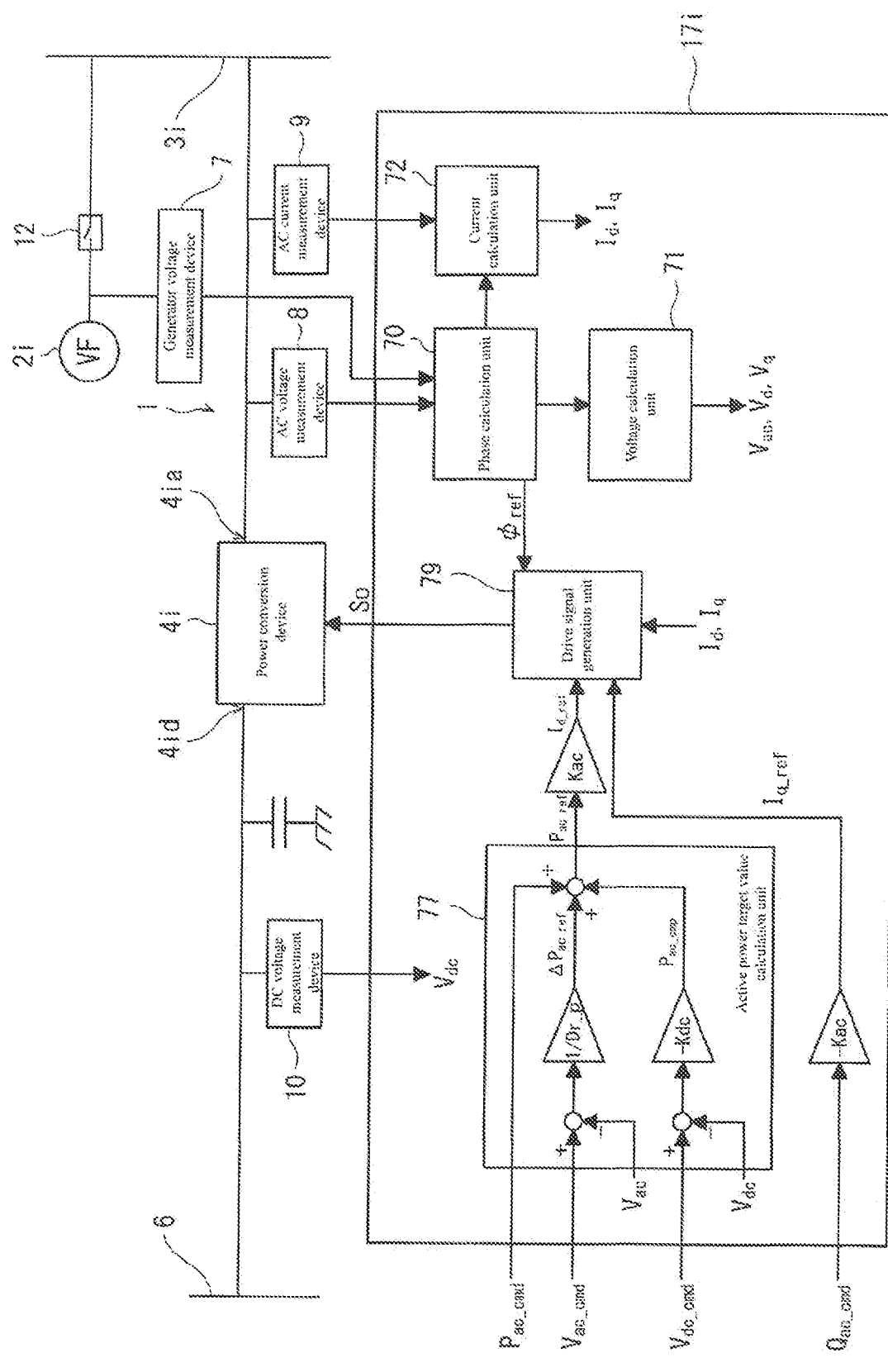
[FIG. 2]

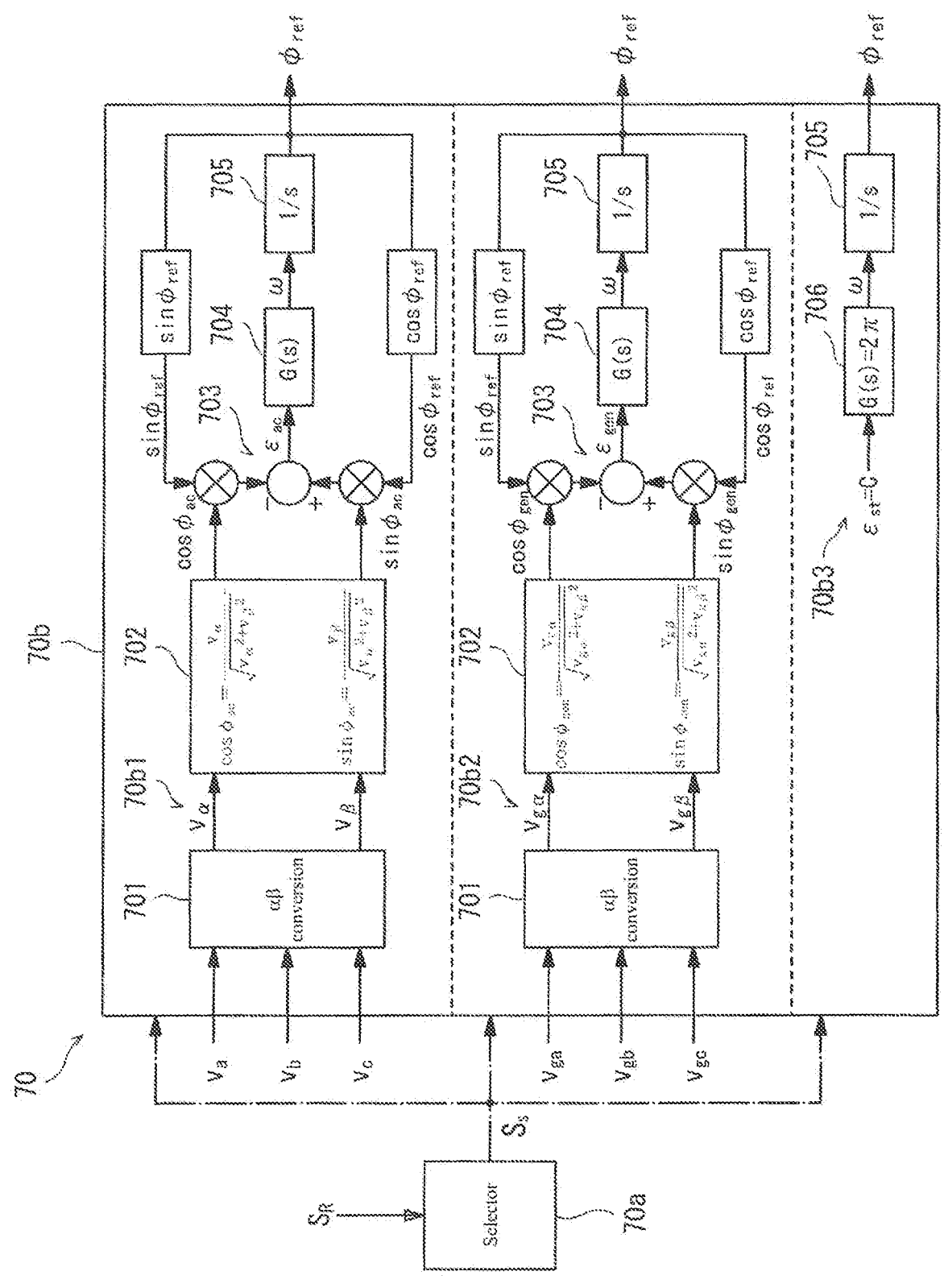
[FIG. 3]

[FIG. 4A]
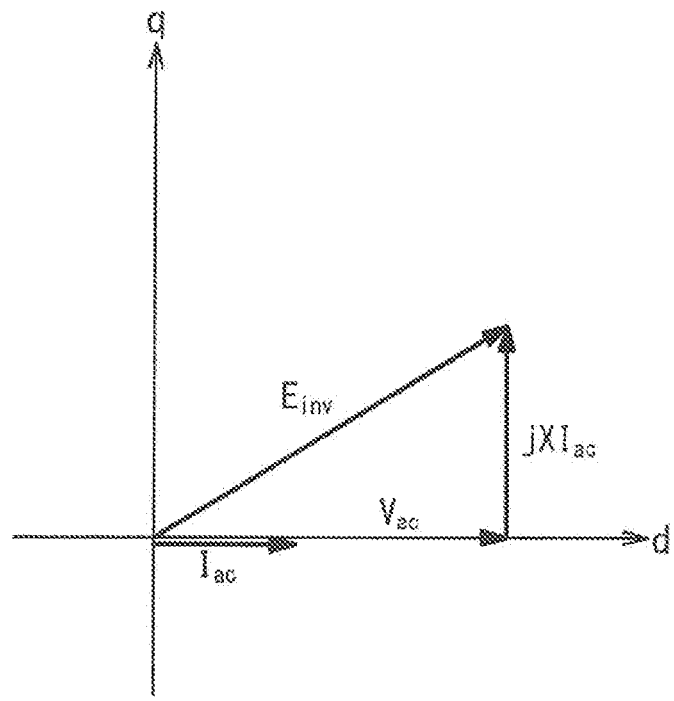
[FIG. 4B]
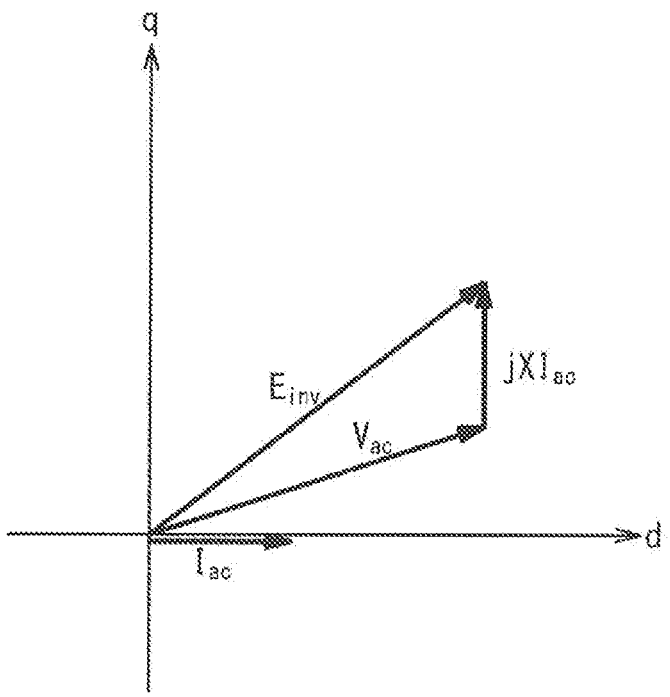

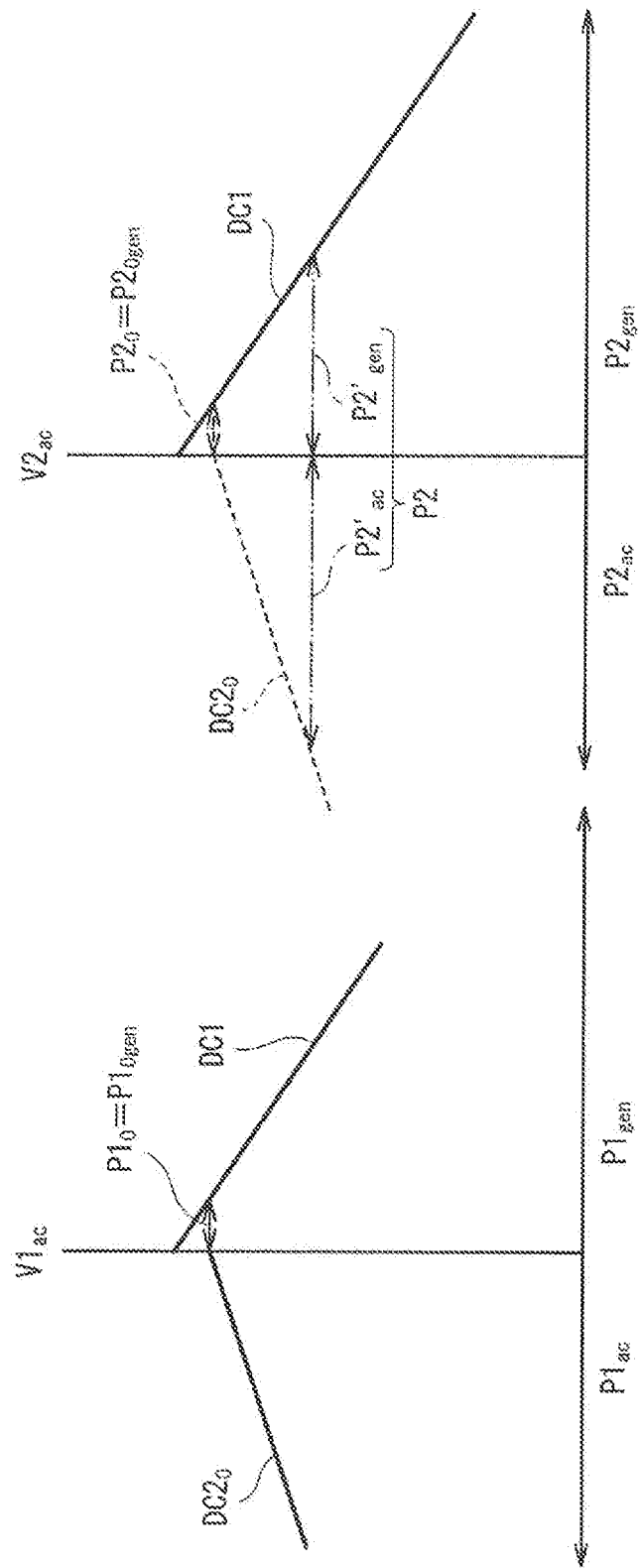
[FIG. 5]

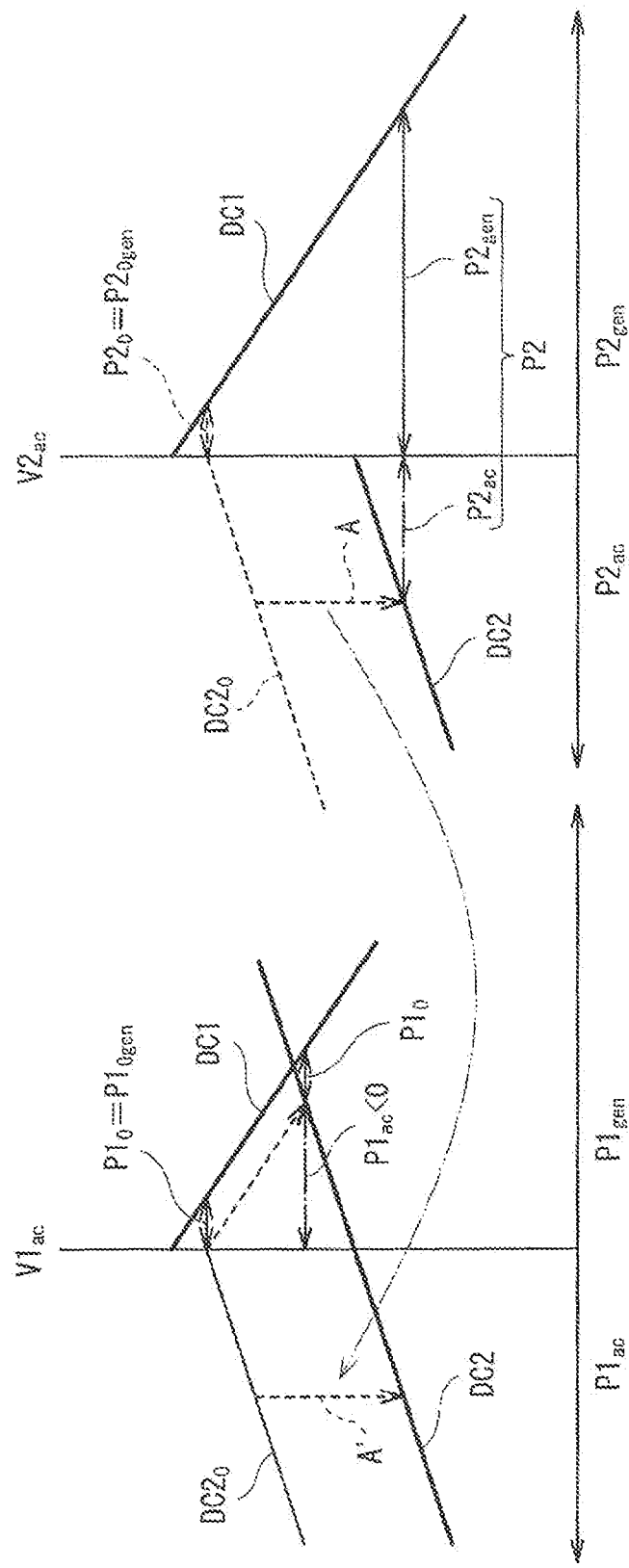
[FIG. 6]

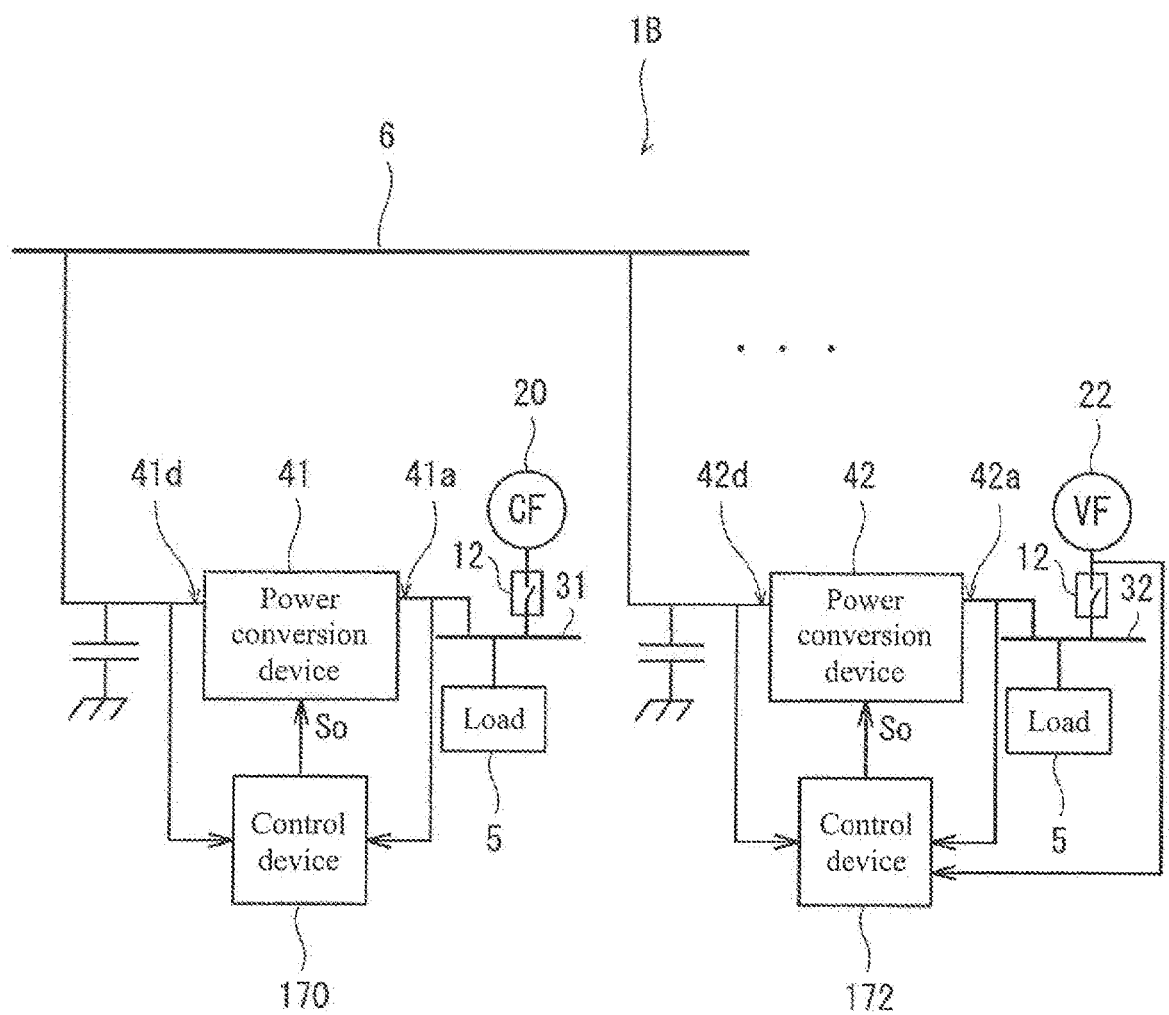
[FIG 7]

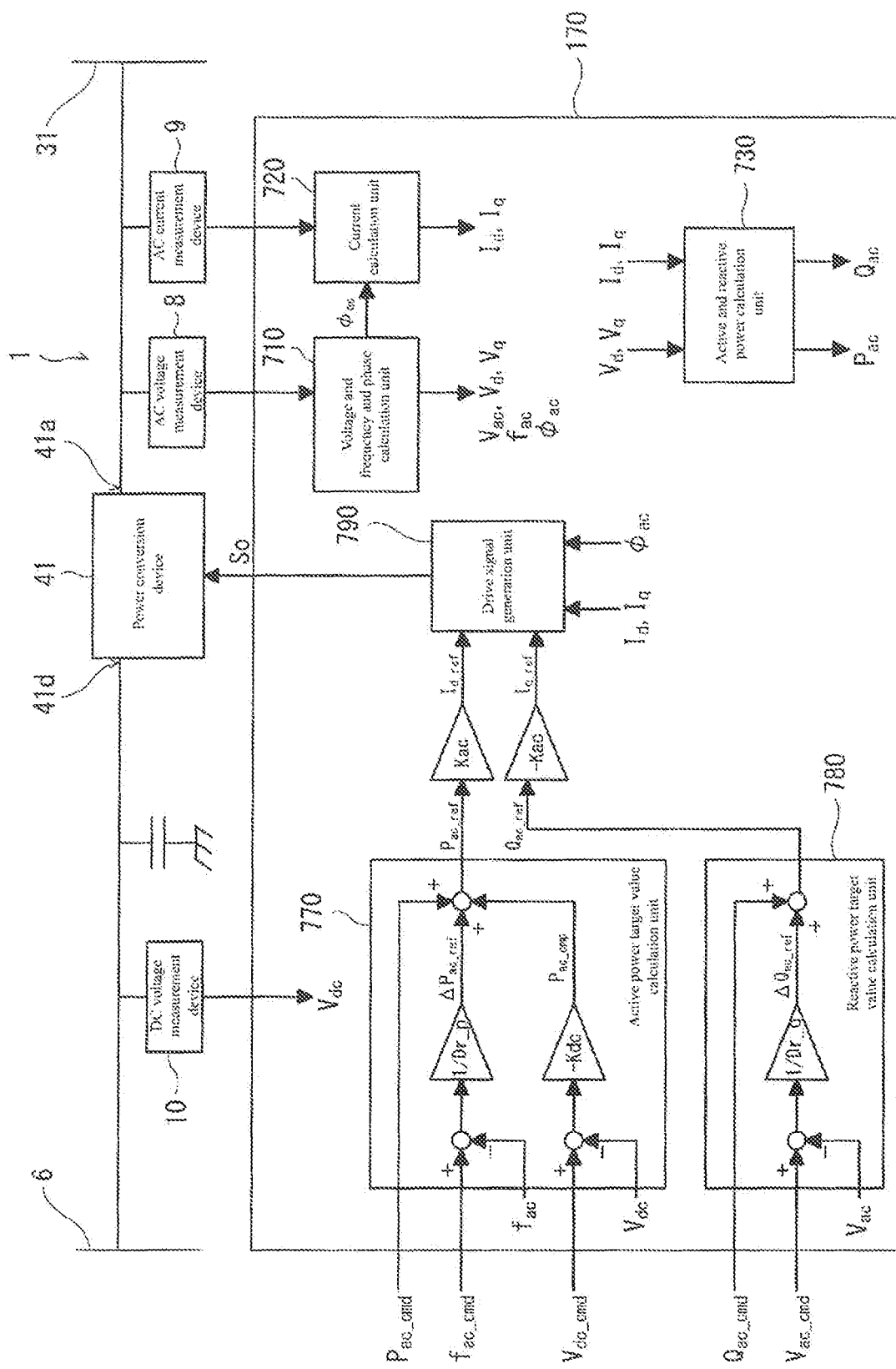
[FIG. 8]

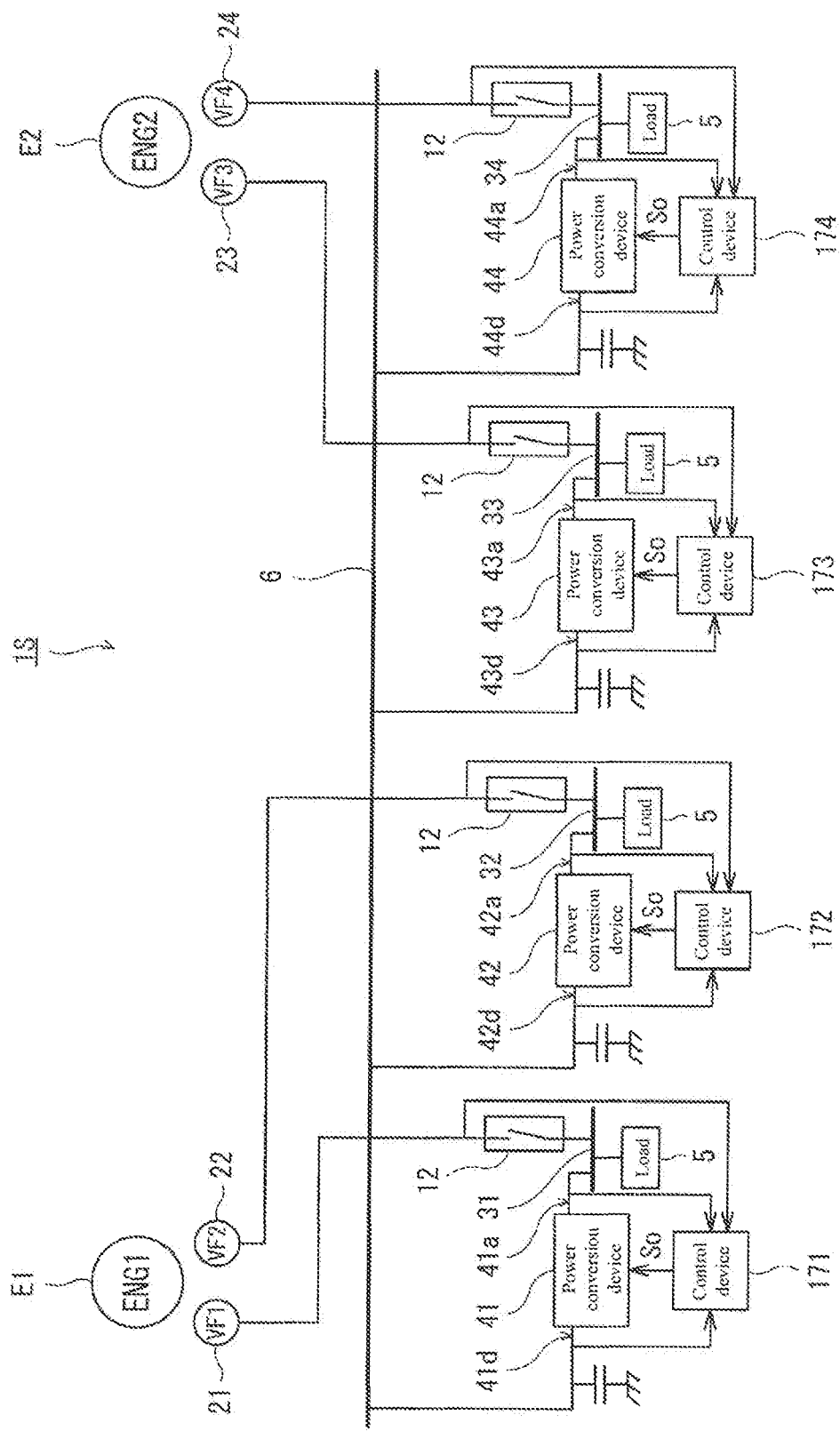
[FIG 9]

[FIG 10]
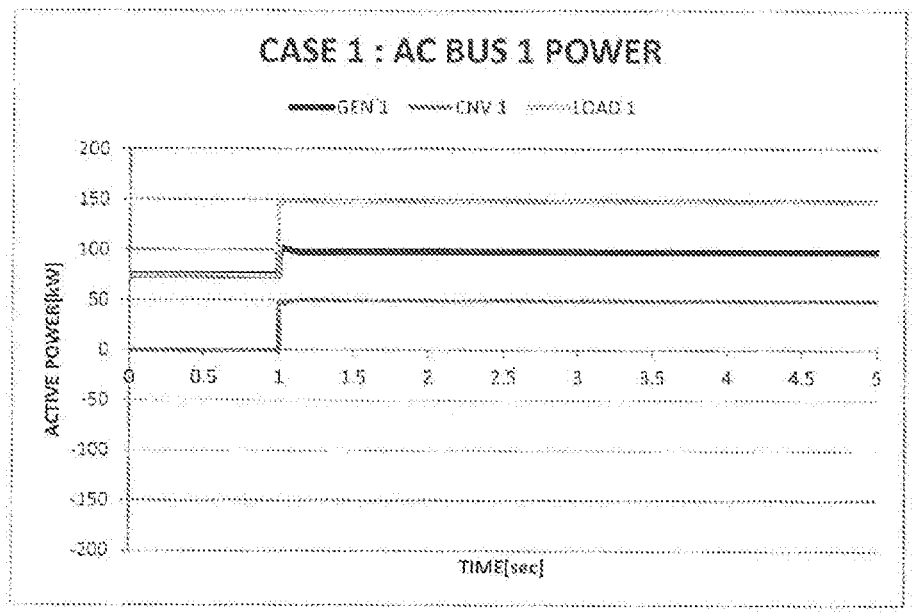
[FIG 11]
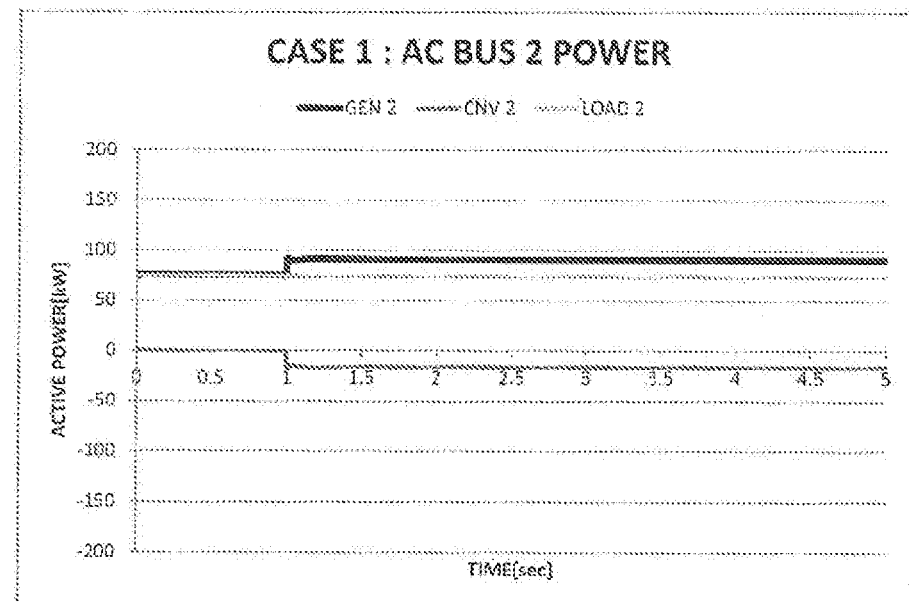

[FIG. 12]
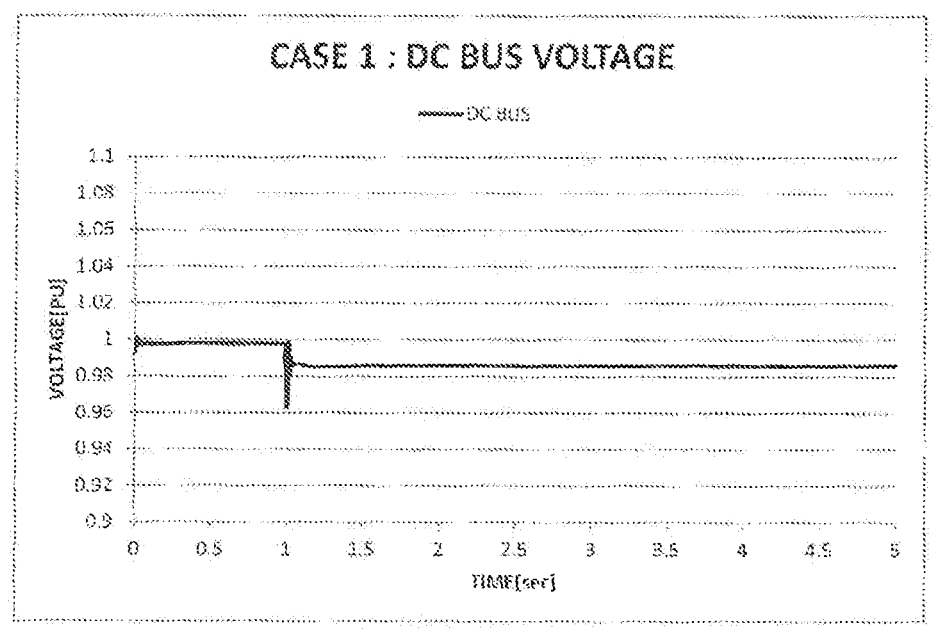
[FIG. 13]
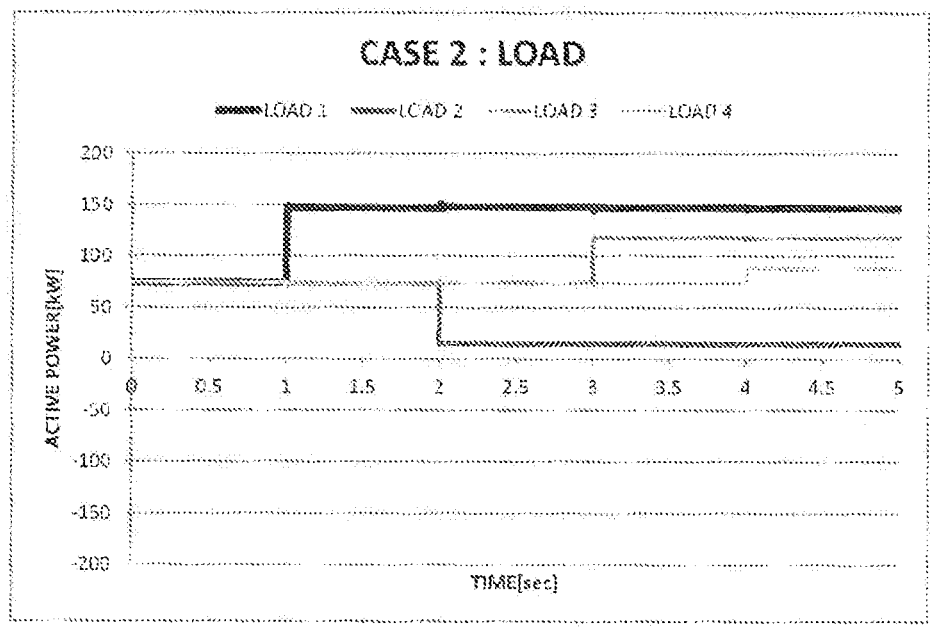

[FIG. 14]
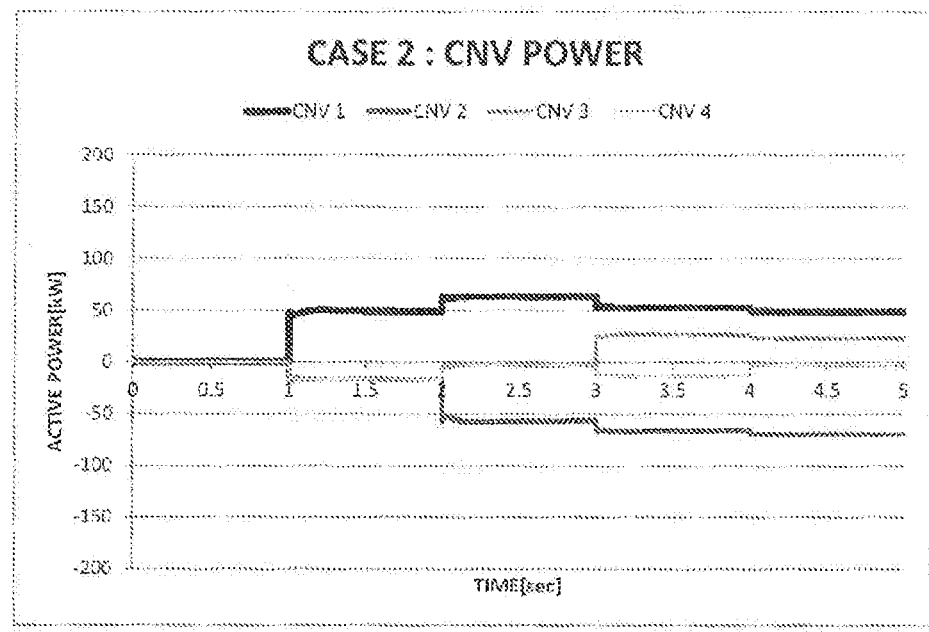
[FIG. 15]
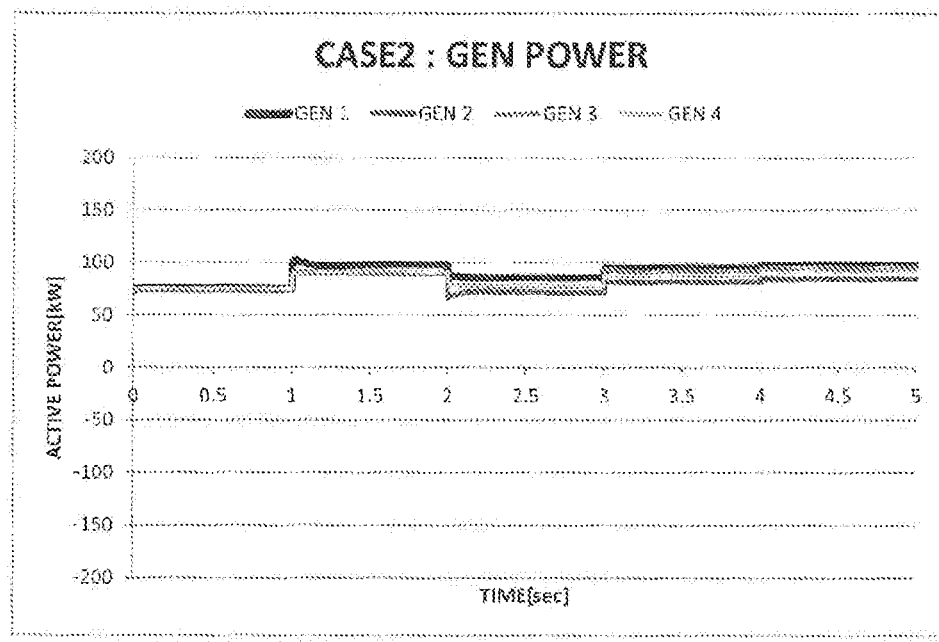

[FIG. 16]
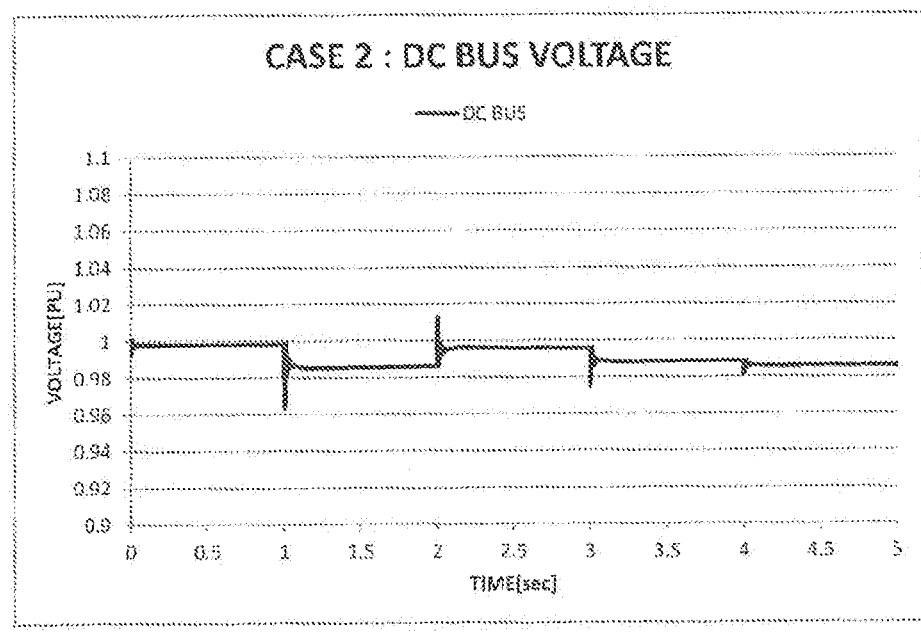
[FIG. 17]
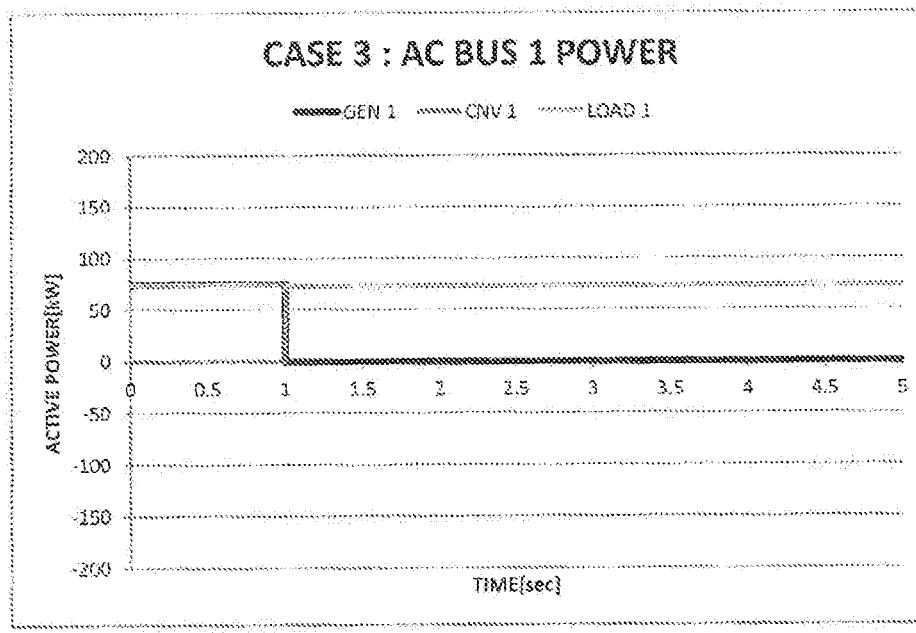

[FIG. 18]
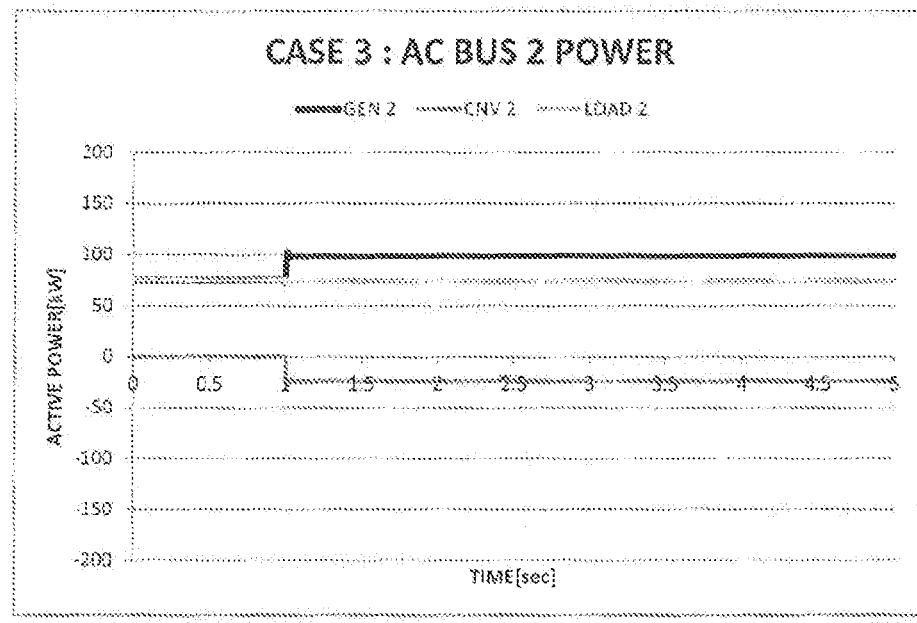
[FIG. 19]
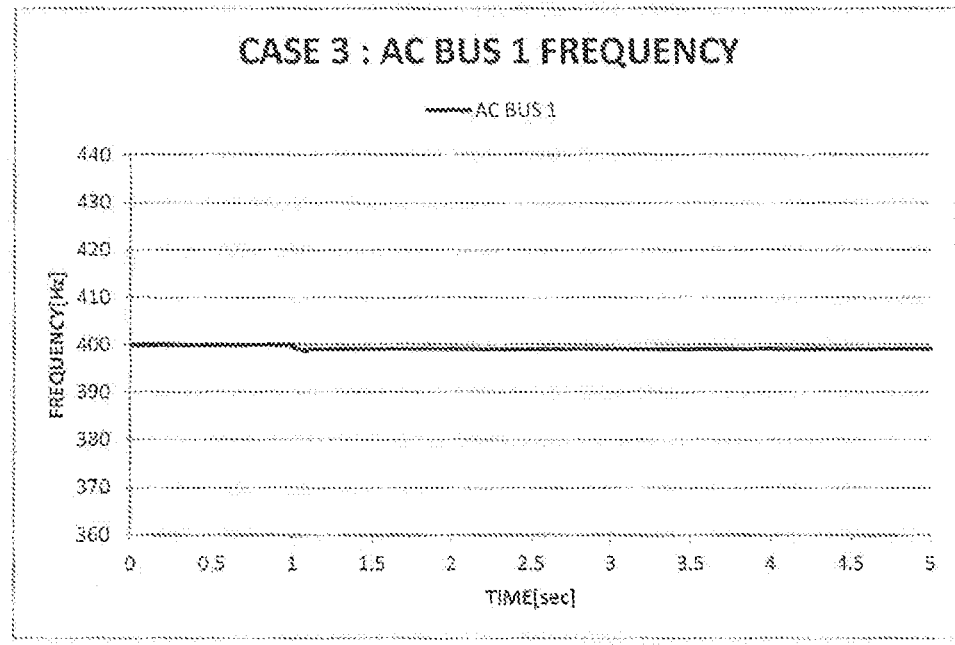

[FIG. 20]
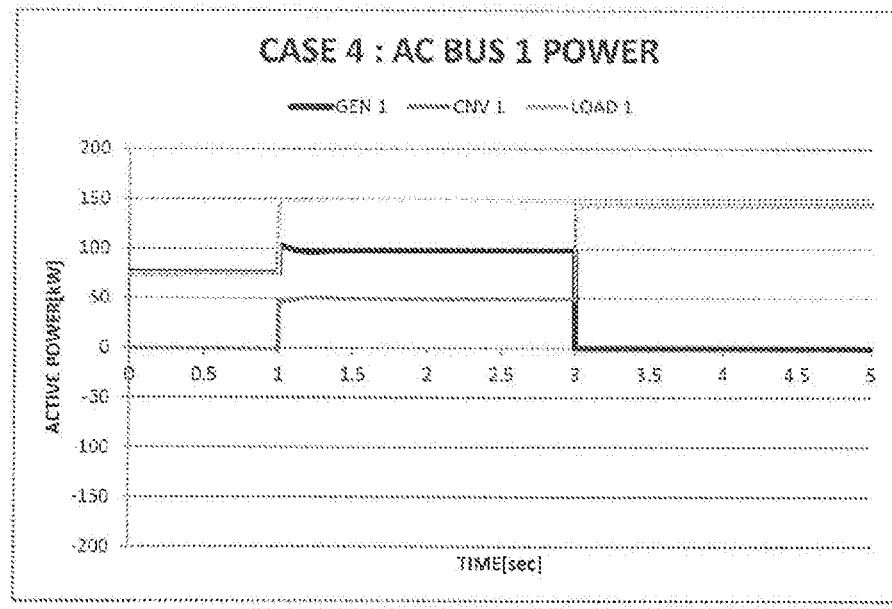
[FIG. 21]
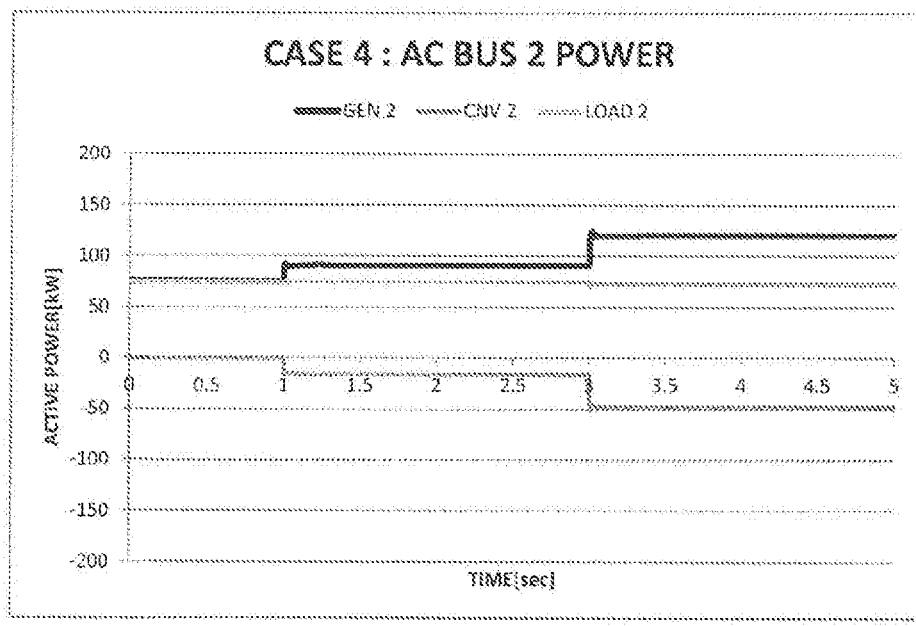

[FIG. 22]
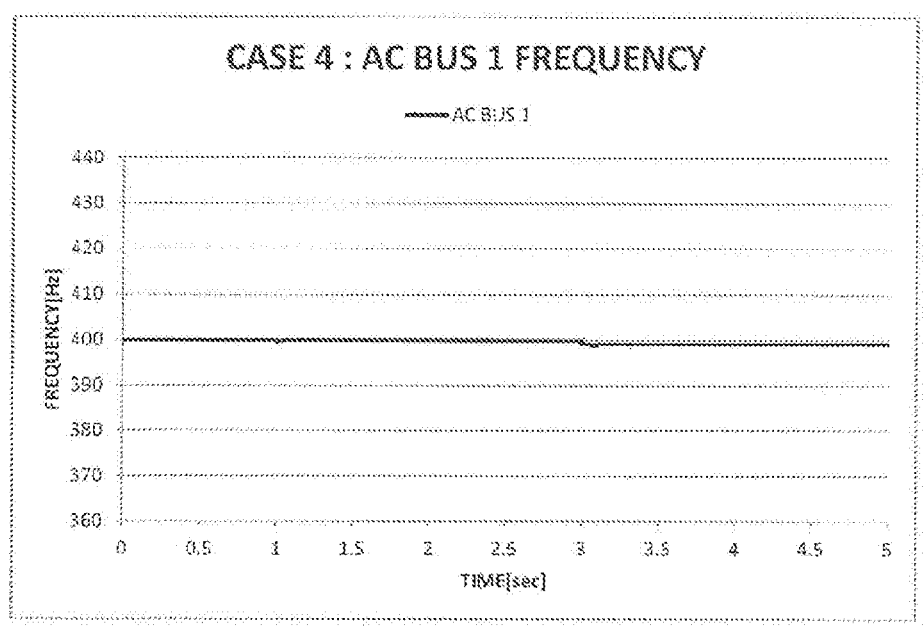

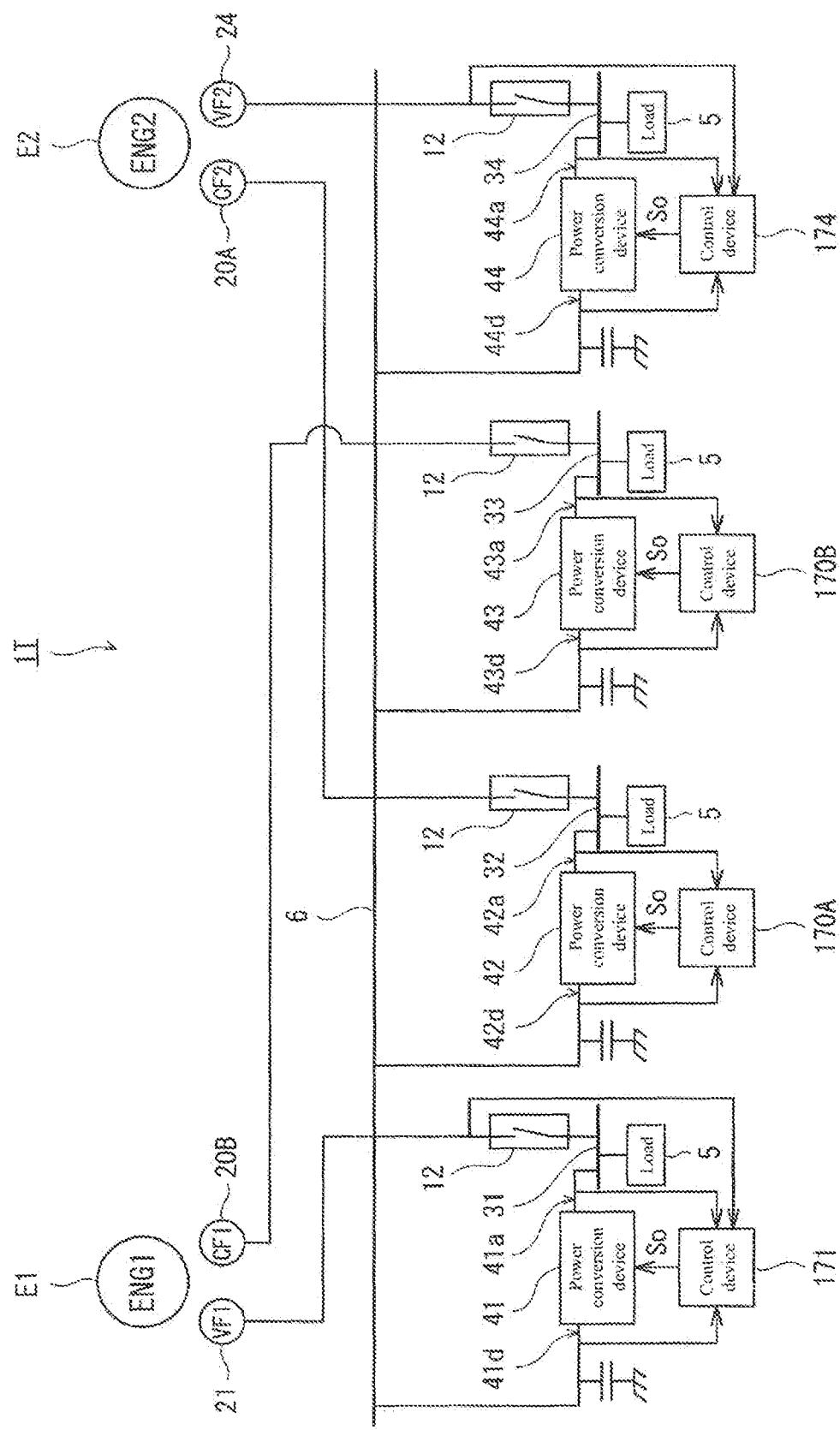

[FIG. 24]
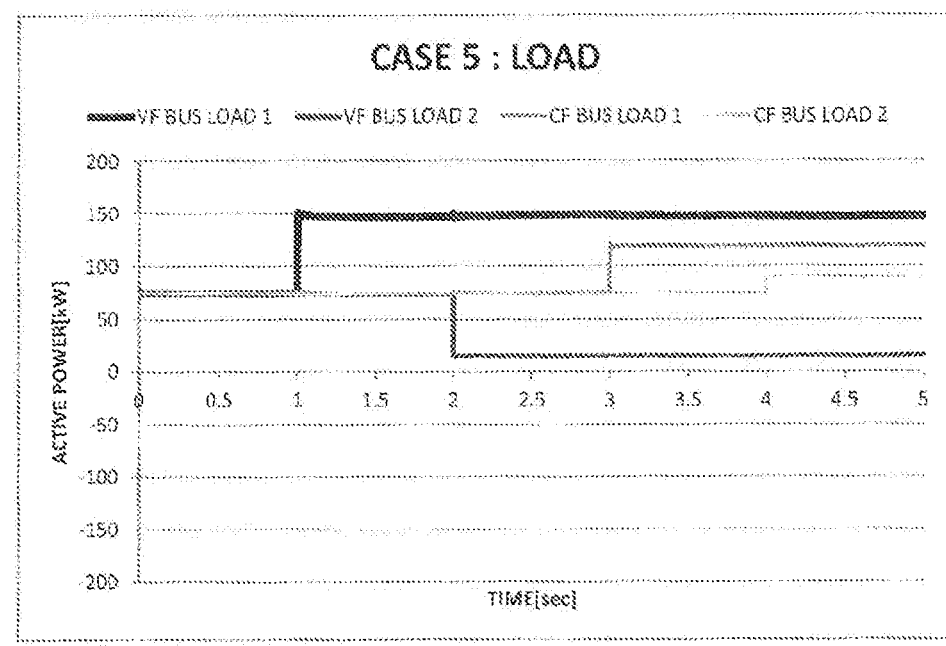
[FIG. 25]
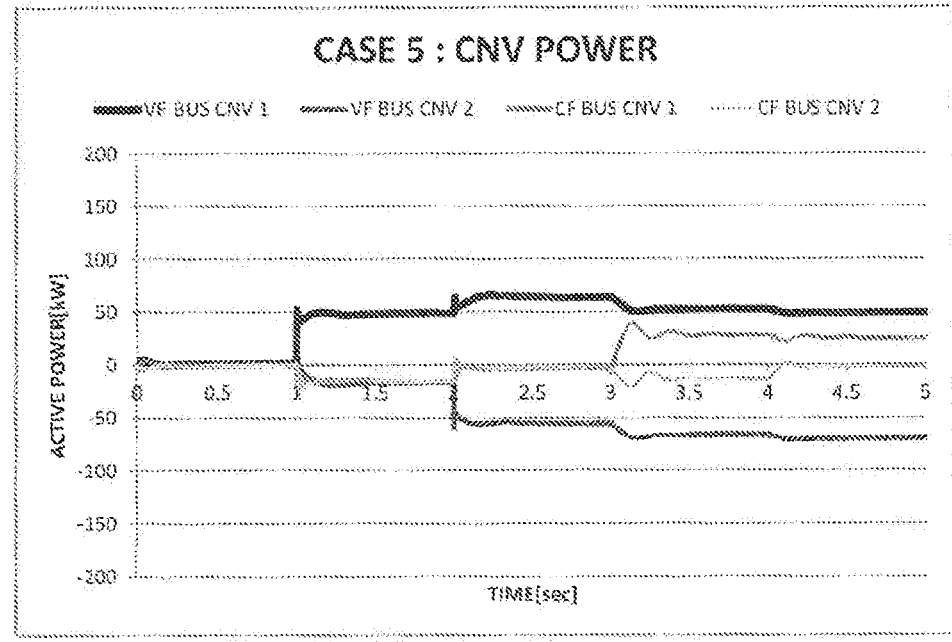

[FIG. 26]
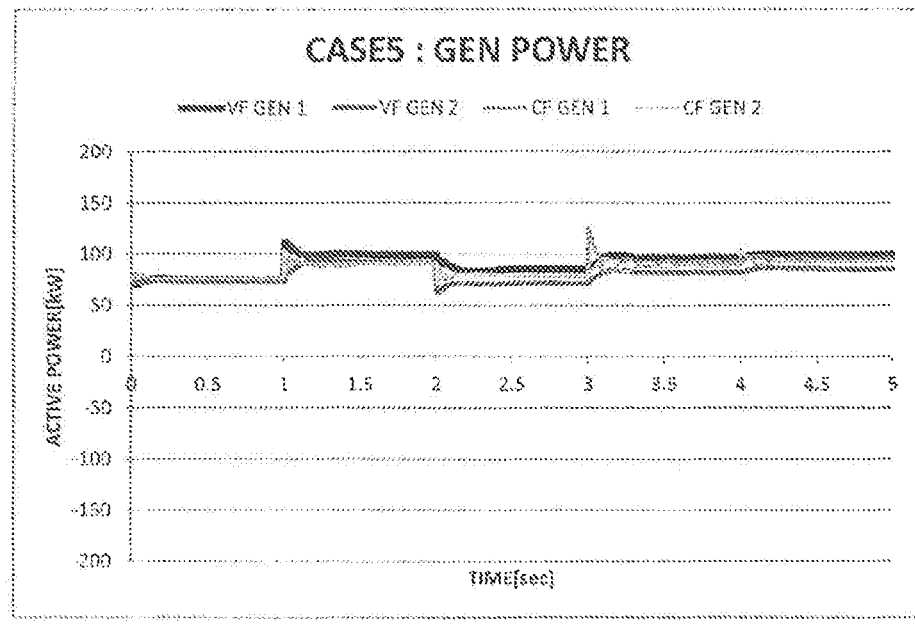
[FIG. 27]
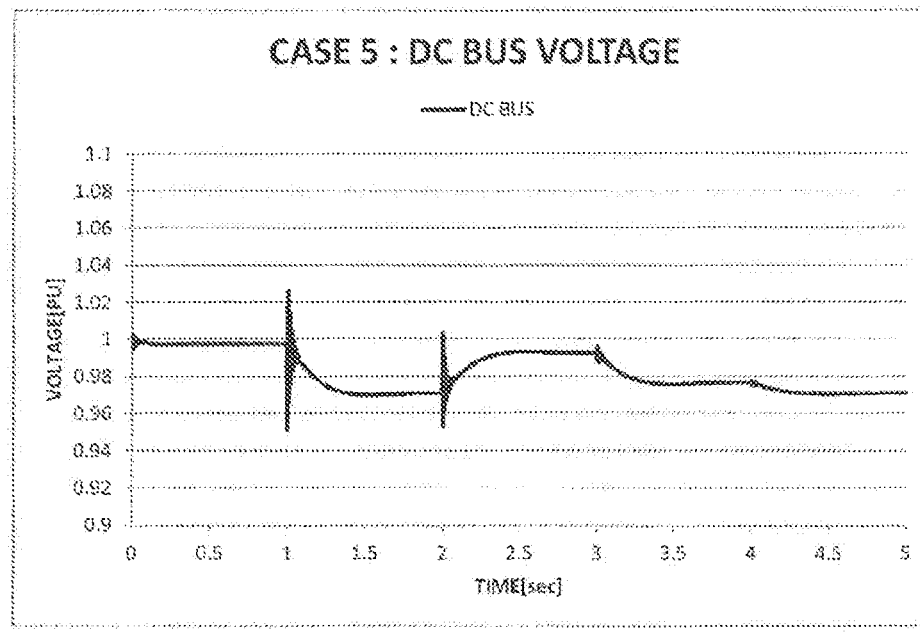

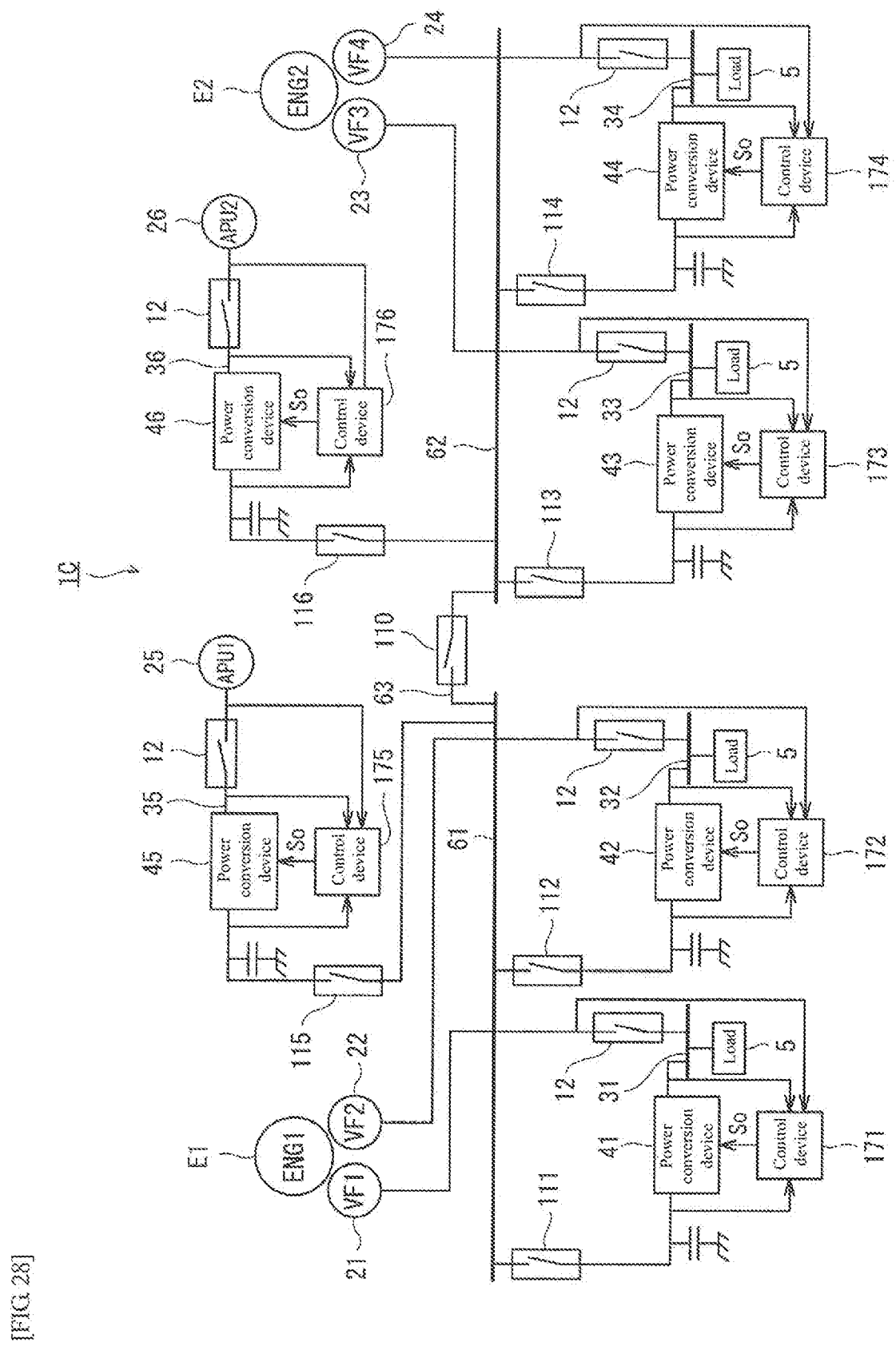
[FIG 28]

[FIG. 29]
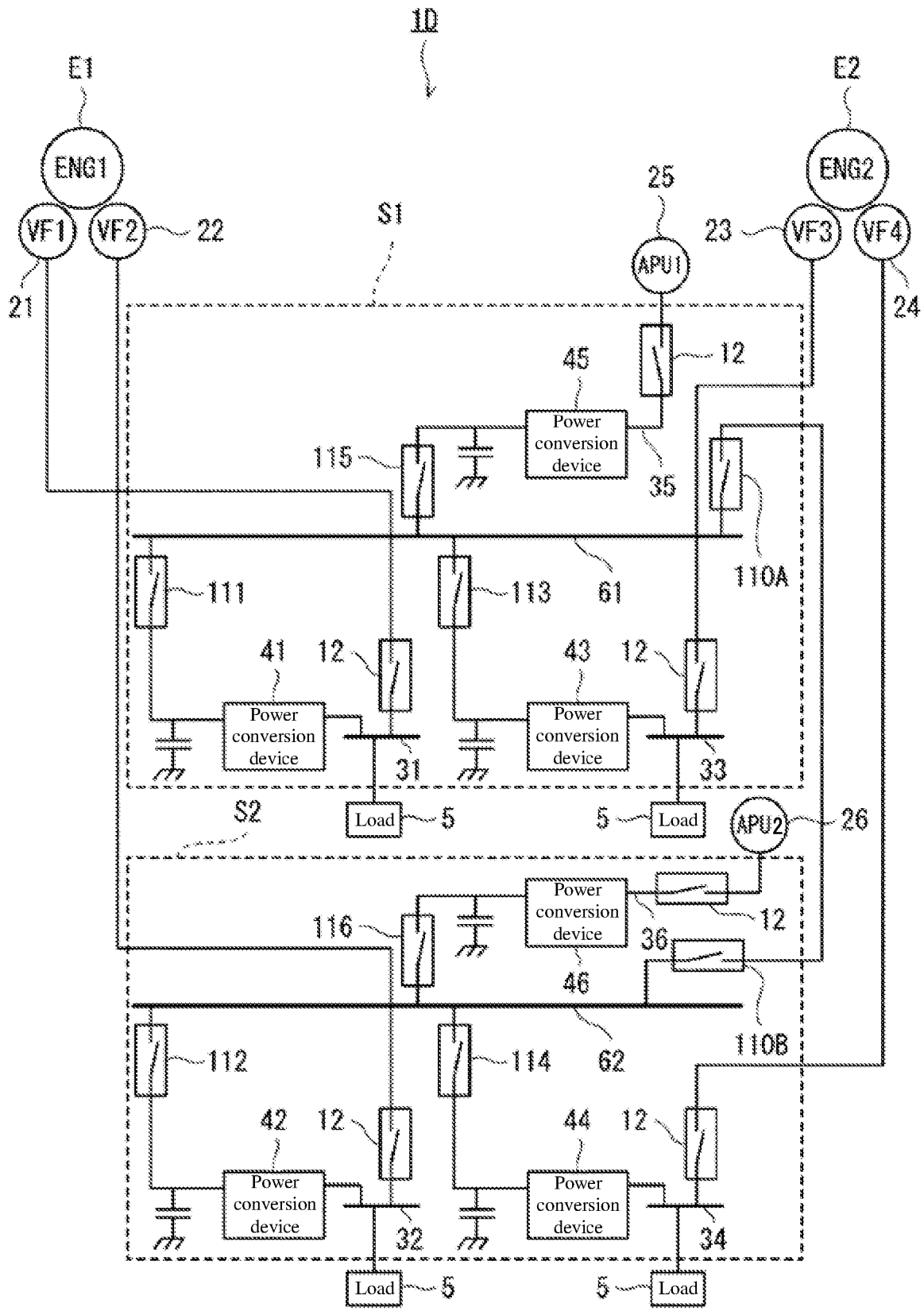

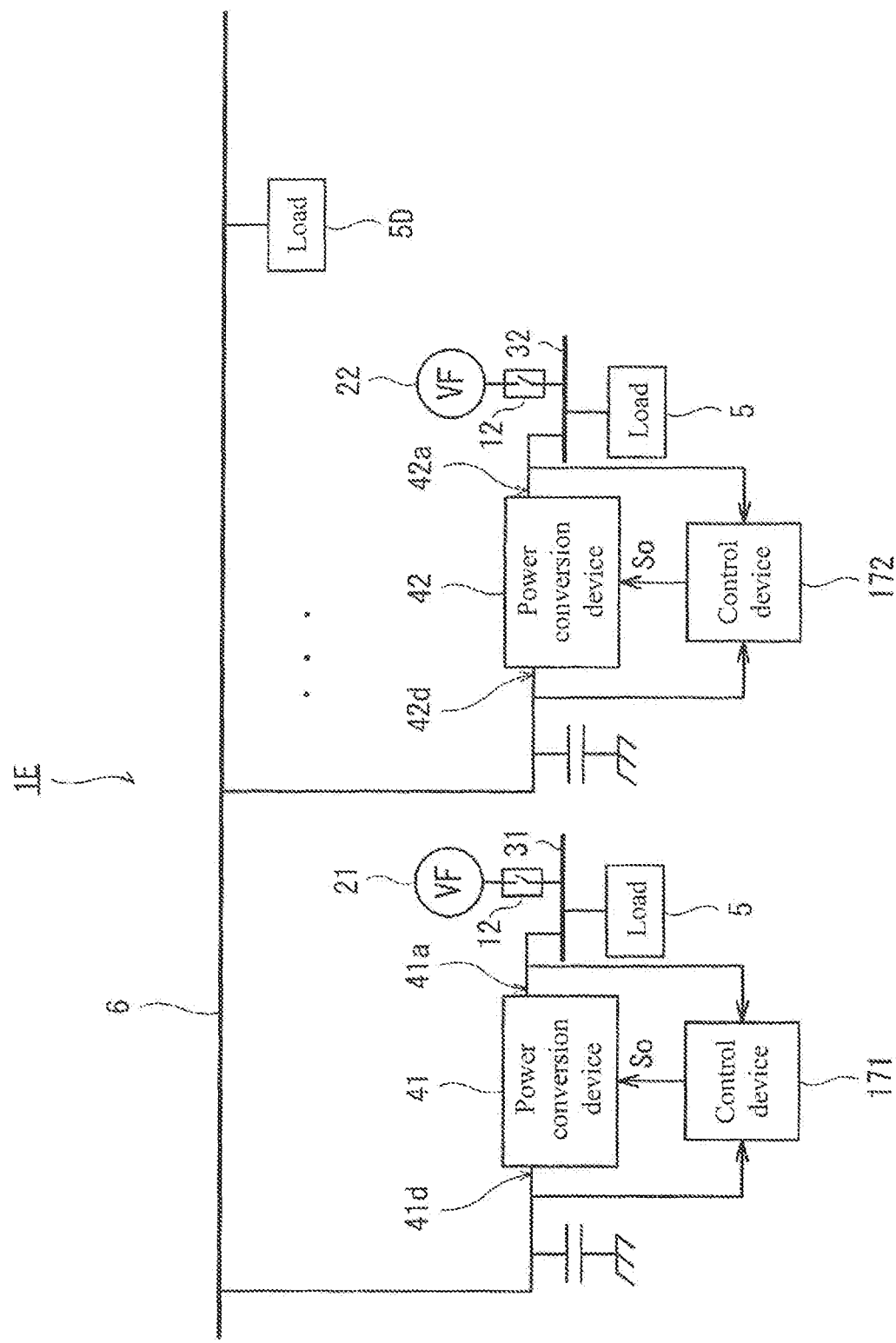

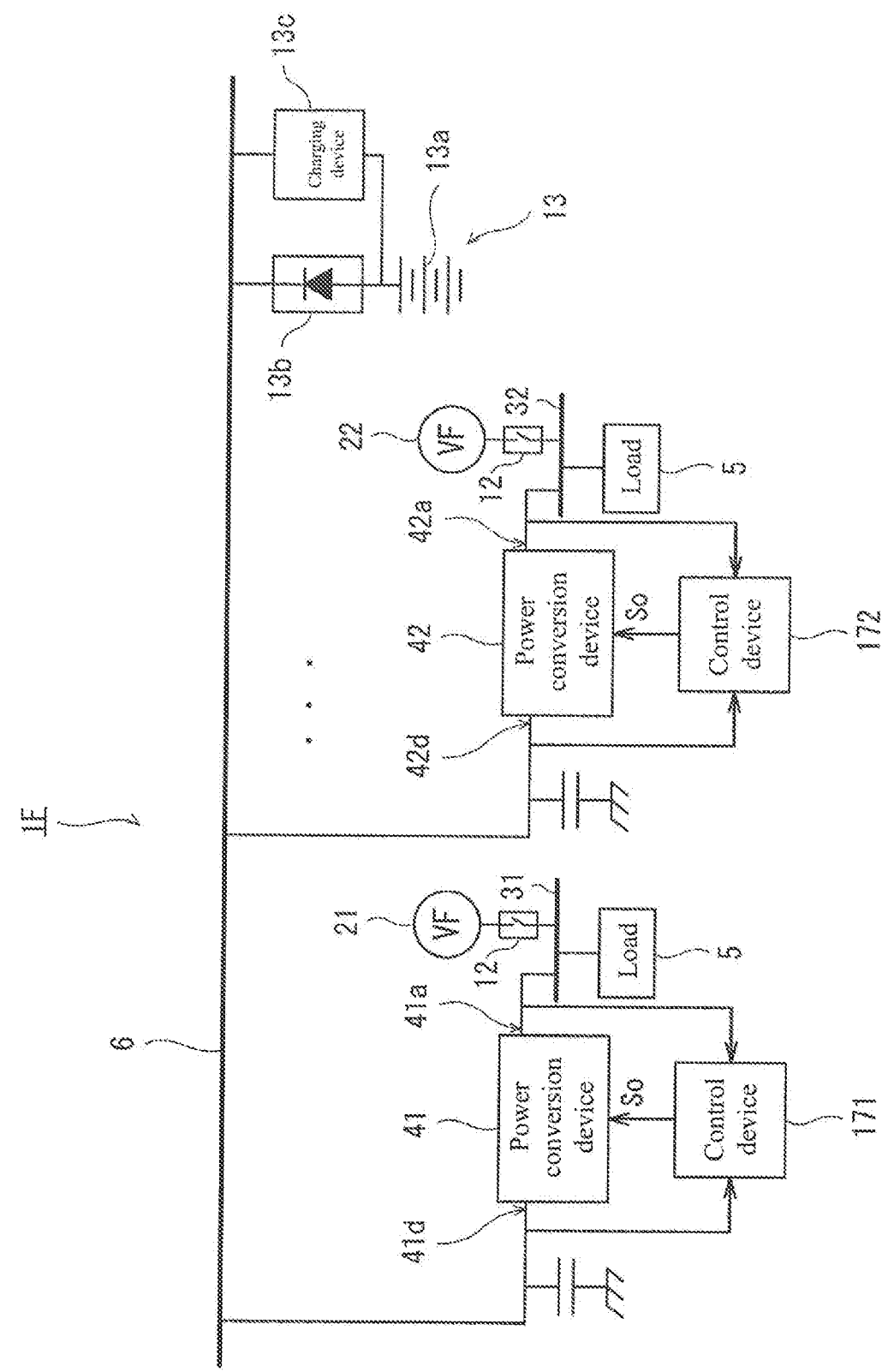
[FIG. 31]

[FIG. 32]
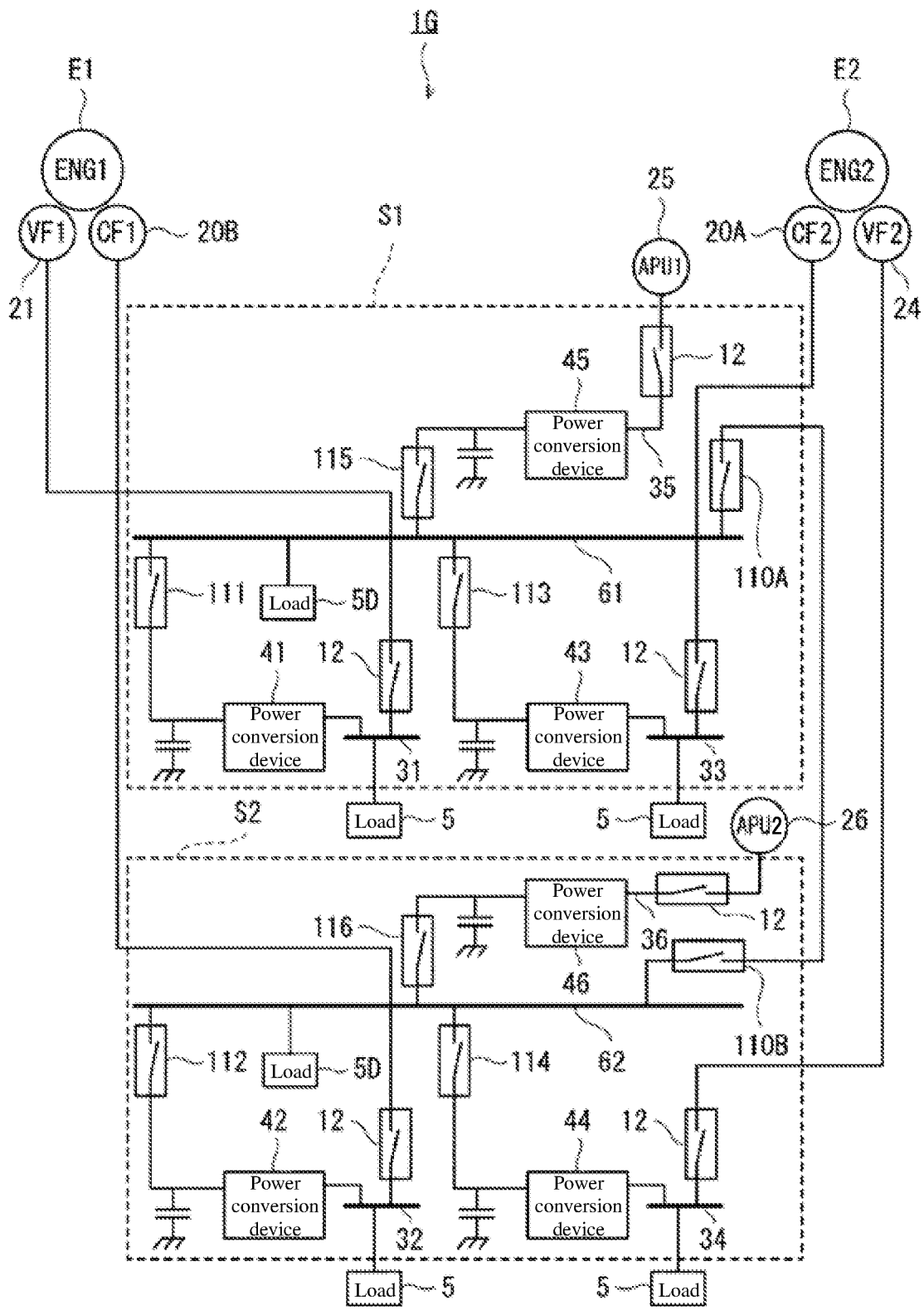

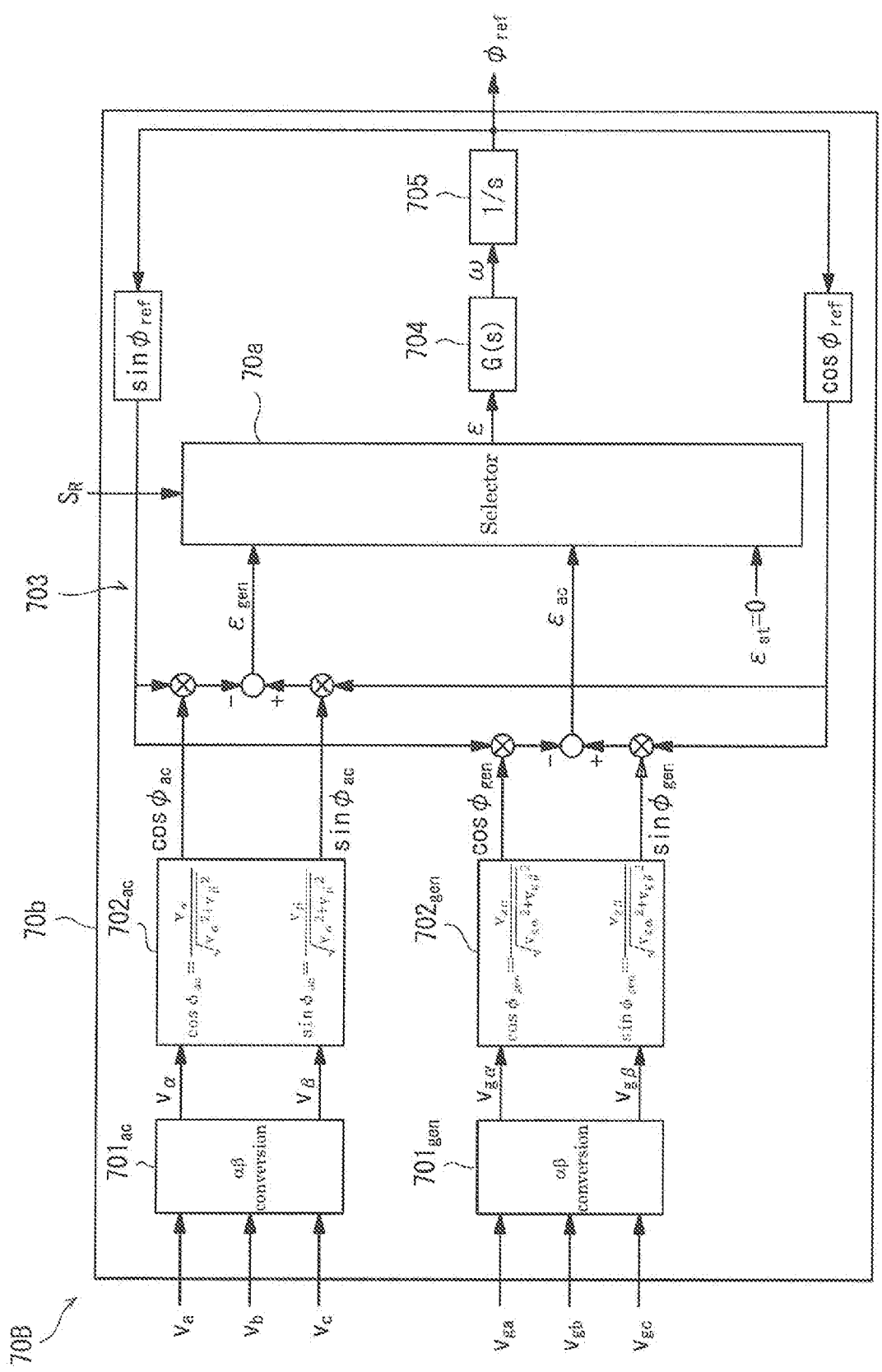

POWER SUPPLY SYSTEM

TECHNICAL FIELD

The present invention relates to a power supply system.

BACKGROUND ART

For example, a power supply system provided with a plurality of generators is known as a power supply system used for an aircraft. As the electrification of devices of the aircraft are increased (More Electric Aircraft (MEA)), power supply capacity also tends to be increased.

In the related art, a large aircraft is configured to supply a power having a constant voltage and a frequency (for example, 200 V and 400 Hz) to each device from a generator built in a transmission (integrated drive generator (IDG)) attached to a main engine. In the case of such a system, since a rotational speed of the main engine of the aircraft is changed according to an operation state of an aircraft body, a continuously variable transmission is provided between the main engine and the generator, and the speed is changed such that the rotational speed is input to the generator is constant. Since the voltage and the frequency are fixed in such a fixed-frequency (constant-frequency (CF)) power supply system using the IDG this power supply system has advantages that it is possible to perform no-break power transfer (NBPT) and drive a motor load directly. Meanwhile, since it is necessary to perform the continuously variable transmission in such a power supply system, the system becomes larger. Thus, there is a limit to the increase in capacity due to a structure thereof.

In contrast, a variable-frequency (VF) power supply system that does not use the continuously variable transmission can be adopted as the power supply system of the aircraft (see, for example, U.S. Pat. No. 8,159,086). The VF generator is connected to the main engine through a transmission with a constant speed change ratio, and a frequency of a generated power is also changed according to the rotational speed of the main engine. Since the VG generator does not have the continuously variable transmission, the device is small, and the capacity of the device is easy to be increased. The variable-frequency power supply system including a plurality of VF generators will be adopted in a large electrified large aircraft in many cases.

CITATION LIST

Patent Literature

PTL 1: U.S. Pat. No. 8,159,086

SUMMARY OF INVENTION

Technical Problem

However, the variable-frequency power supply system of the related art has a problem that a power supply cannot be switched without uninterrupted. In order to switch between the generators without instantaneous interruption, it is necessary to temporarily operate the generators in parallel by synchronizing the voltage, the frequency, and the phase. However, since the frequency of the VF generator follows the rotational speed of the main engine, the frequency cannot be adjusted. Thus, the instantaneous interruption (temporary power failure) occurs when the power supply is switched.

In the configuration of PTL 1, a controller adjusts an output frequency of a temporary power supply from a frequency of a first AC wiring portion to a frequency of a second AC wiring portion, and thus, the switching of the power is performed without instantaneous interruption. However, when one generator is suddenly stopped due to a failure and the like, the frequency cannot be adjusted, and the instantaneous interruption occurs.

The present invention has been made to solve the aforementioned problems, and an object of the present invention is to provide a power supply system capable of continuing power supply to each wiring portion even when an abnormality occurs in one generator in the power supply system in which a plurality of wiring portions each having at least one generator is interconnected.

Solution to Problem

A power supply system according to an aspect of the present invention is a power supply system including a plurality of generators. The system includes a plurality of AC wiring portions that is connected to the plurality of generators, a plurality of power conversion devices that is connected to the plurality of AC wiring portions, a DC wiring portion that connects the plurality of power conversion devices, and a control device that performs power conversion control between a corresponding AC wiring portion and the DC wiring portion by transmitting a drive signal to the plurality of power conversion devices. At least one of the plurality of generators is a first generator configured such that a relationship of a generator output voltage with respect to a generator active power output from the generator to a corresponding first AC wiring portion has a predetermined first drooping characteristic, each of the plurality of power conversion devices is configured to convert an AC power input via each AC wiring portion into a DC power, and convert a DC power input via the DC wiring portion into an AC power, and the control device is configured to generate the drive signal for the power conversion device by deciding a target value of a first control element such that a relationship of an AC wiring portion voltage with respect to a power conversion device active power output from the power conversion device to the first AC wiring portion corresponding to the first generator has a predetermined second drooping characteristic and correcting the target value of the first control element according to the DC voltage at the DC wiring portion.

According to the aforementioned configuration, at least one generator (first generator) of the plurality of generators has the first drooping characteristic, and the target value of the first control element for the AC and DC conversion is decided such that the relationship of the AC wiring portion voltage with respect to the power conversion device active power voltage output from the power conversion device to the corresponding first AC wiring portion has the second drooping characteristic. Accordingly, a power corresponding to a change of an active power at the first AC wiring portion caused by a load change can be transferred between the plurality of wiring portions regardless of the frequency of the first generator. The target value of the first control element is corrected according to the DC voltage at the DC wiring portion. Accordingly, it is possible to suppress the DC voltage from being excessively decreased or increased, and it is possible to balance the transfer of the power between the plurality of power conversion devices connected by the common DC wiring portion. In this manner, the plurality of power conversion devices executes the same control mode while taking into account the DC voltage at the DC wiring portion, and thus, the power output at each AC wiring portion is controlled. Therefore, the power supply to each wiring portion can be continued even when one generator is stopped while the same control mode is executed regardless of whether or not the generator is abnormal.

The control device may include an active power target value calculation unit that calculates an active power target value by active power target value calculation processing including calculation for receiving the AC wiring portion voltage of the first AC wiring portion and obtaining an active power reference value obtained by multiplying a value based on a deviation of the AC wiring portion voltage from a predetermined voltage command value by a coefficient indicating the second drooping characteristic.

The control device may include a phase calculation unit that receives the generator output voltage of the first generator and the AC wiring portion voltage at the first AC wiring portion corresponding to the first generator, and calculates a phase target value of the first AC wiring portion corresponding to the first generator, and the control device may be configured to receive an AC current of the first AC wiring portion, generate a pair of AC current target values by the active power target value and a predetermined reactive power command value, set a target value of the AC current output to the first AC wiring portion to the AC current target value, and generate the drive signal for matching a phase of the AC current with the phase target value.

The active power target value calculation unit may be configured to calculate an active power correction value obtained by multiplying a deviation of the DC voltage from a predetermined DC voltage command value by a predetermined correction coefficient, and calculate the active power target value by adding the active power reference value and the active power correction value to a predetermined active power command value.

The phase calculation unit may be configured to output a predetermined value as the phase target value when the first generator is stopped, calculate the phase target value by using a generator voltage of the corresponding first generator when the first generator and the corresponding first AC wiring portion are disconnected, and calculate the phase target value by using the AC wiring portion voltage at the first AC wiring portion when the first generator and the corresponding first AC wiring portion are interconnected. Accordingly, even when the phase of the generator voltage and the phase of the AC wiring portion voltage do not match, it is possible to calculate an appropriate phase target value according to an operation situation.

The first generator may include a variable-frequency generator which is connected to a rotator and in which a frequency of a generated power is changed according to a rotational speed of the rotator.

At least one of the plurality of generators may be a second generator configured such that a relationship of a frequency with respect to the generator active power output from the generator to a corresponding second AC wiring portion has a predetermined third drooping characteristic, and the control device may be configured to generate the drive signal for the power conversion device by deciding a target value of a second control element such that a relationship of the frequency with respect to the power conversion device active power output from the power conversion device to the second AC wring portion corresponding to the second generator has a predetermined fourth drooping characteristic and correcting the target value of the second control element according to the DC voltage at the DC wiring portion.

Accordingly, in the second generator of the constant frequency control, the target value of the second control element for the AC and DC conversion in the power conversion device is decided such that the relationship of the frequency with respect to the power conversion device active power output from the power conversion device to the corresponding second AC wiring portion has the fourth drooping characteristic. Therefore, the transfer of the power can be performed between the variable-frequency AC power supply system to which the first generator of which the frequency is variably controlled is connected and the constant-frequency AC power supply system to which the second generator of which the frequency is fixedly controlled is connected. Therefore, the power supply system can be selected according to the characteristics of the load, and a more efficient device configuration can be achieved.

Advantageous Effects of Invention

According to the present invention, it is possible to provide a power supply system capable of continuing power supply to each wiring portion even when an abnormality occurs in one generator in the power supply system in which a plurality of wiring portions each having at least one generator is interconnected.

BRIEF DESCRIPTION OF DRAWINGS

FIG. 1 is a block diagram illustrating a schematic configuration of a power supply system according to Embodiment 1 of the present invention.

FIG. 2 is a block diagram illustrating a schematic configuration of a control system in the power supply system illustrated in FIG. 1.

FIG. 3 is a block diagram illustrating a schematic configuration of a phase calculation unit illustrated in FIG. 2.

FIG. 4A is a vector diagram illustrating a relationship between an output voltage of an AC portion of a power conversion device according to the present embodiment, an AC wiring portion voltage, and an AC current output from the power conversion device to an AC wiring portion.

FIG. 4B is a vector diagram illustrating a relationship between the output voltage of the AC portion of the power conversion device according to the present embodiment, the AC wiring portion voltage, and the AC current output from the power conversion device to the AC wiring portion.

FIG. 5 is a graph illustrating a relationship between an active power and an AC wiring portion voltage in each of two AC wiring portions.

FIG. 6 is a graph illustrating the relationship between the active power and the AC wiring portion voltage in each of two AC wiring portions.

FIG. 7 is a block diagram illustrating a schematic configuration of a power supply system according to Embodiment 2 of the present invention.

FIG. 8 is a block diagram illustrating a schematic configuration of a control system of a power conversion device corresponding to a generator having a third drooping characteristic in the power supply system illustrated in FIG. 7.

FIG. 9 is a block diagram illustrating a configuration example for simulating the power supply system according to Embodiment 1.

FIG. 10 is a graph illustrating a result of a simulation (case 1) in the power supply system illustrated in FIG. 9.

FIG. 11 is a graph illustrating the result of the simulation (case 1) in the power supply system illustrated in FIG. 9.

FIG. 12 is a graph illustrating the result of the simulation (case 1) in the power supply system illustrated in FIG. 9.

FIG. 13 is a graph illustrating a result of a simulation (case 2) in the power supply system illustrated in FIG. 9.

FIG. 14 is a graph illustrating the result of the simulation (case 2) in the power supply system illustrated in FIG. 9.

FIG. 15 is a graph illustrating the result of the simulation (case 2) in the power supply system illustrated in FIG. 9.

FIG. 16 is a graph illustrating the result of the simulation (case 2) in the power supply system illustrated in FIG. 9.

FIG. 17 is a graph illustrating a result of a simulation (case 3) in the power supply system illustrated in FIG. 9.

FIG. 18 is a graph illustrating the result of the simulation (case 3) in the power supply system illustrated in FIG. 9.

FIG. 19 is a graph illustrating the result of the simulation (case 3) in the power supply system illustrated in FIG. 9.

FIG. 20 is a graph illustrating a result of a simulation (case 4) in the power supply system illustrated in FIG. 9.

FIG. 21 is a graph illustrating the result of the simulation (case 4) in the power supply system illustrated in FIG. 9.

FIG. 22 is a graph illustrating the result of the simulation (case 4) in the power supply system illustrated in FIG. 9.

FIG. 23 is a block diagram illustrating a configuration example for a simulation of the power supply system according to Embodiment 2.

FIG. 24 is a graph illustrating a result of a simulation (case 5) in the power supply system illustrated in FIG. 23.

FIG. 25 is a graph illustrating the result of the simulation (case 5) in the power supply system illustrated in FIG. 23.

FIG. 26 is a graph illustrating the result of the simulation (case 5) in the power supply system illustrated in FIG. 23.

FIG. 27 is a graph illustrating the result of the simulation (case 5) in the power supply system illustrated in FIG. 23.

FIG. 28 is a block diagram for describing one of application examples of the power supply system according to Embodiment 1 to an aircraft.

FIG. 29 is a block diagram for describing another one of the application examples of the power supply system according to Embodiment 1 to an aircraft.

FIG. 30 is a block diagram for describing still another one of the application examples of the power supply system according to Embodiment 1 to the aircraft.

FIG. 31 is a block diagram for describing still another one of the application examples of the power supply system according to Embodiment 1 to an aircraft.

FIG. 32 is a block diagram for describing one of application examples of the power supply system according to Embodiment 2 to the aircraft.

FIG. 33 is a block diagram illustrating a schematic configuration of a phase calculation unit according to a modification example of Embodiment 1.

DESCRIPTION OF EMBODIMENTS

Hereinafter, embodiments of the present invention will be described with reference to the drawings. Hereinafter, elements having the same or similar functions are denoted by the same reference signs throughout all the drawings, and redundant description thereof will be omitted.

Embodiment 1

[System Configuration]

Hereinafter, Embodiment 1 of the present invention will be described. FIG. 1 is a block diagram illustrating a schematic configuration of a power supply system according to Embodiment 1 of the present invention. The power supply system 1 according to the present embodiment includes a plurality (two in the example of FIG. 1) of generators $2i$ ($i=1, 2, \ldots$). The power supply system 1 includes a plurality of AC wiring portions (AC BUS) $3i$ connected to the plurality of generators $2i$. That is, one generator $2i$ is connected to one AC wiring portion $3i$, and supplies an AC power to a load 5 connected to the AC wiring portion $3i$.

In the present embodiment, each generator $2i$ is configured such that a relationship of a generator output voltage with respect to an active power output to the corresponding AC wiring portion $3i$ by each generator $2i$ has a predetermined first drooping characteristic. When each generator (first generator) $2i$ and the corresponding AC wiring portion (first AC wiring portion) $3i$ are interconnected, each generator $2i$ has characteristics of increasing the active power (generator active power) to be output as an AC wiring portion voltage is decreased in the AC wiring portion $3i$. For example, when the generator $2i$ is an engine generator, when the power consumption of the load 5 is increased and the AC wiring portion voltage at the AC wiring portion $3i$ to which the load 5 is connected is decreased, an output power of the generator $2i$ is increased, and the AC wiring portion voltage is controlled so as to be balanced by a value corresponding to the first drooping characteristic. The generator $2i$ is not particularly limited as long as the generator has such a first drooping characteristic. For example, the generator may be a prime mover generator or a fuel cell generator.

The generator $2i$ having such a first drooping characteristic is a variable-frequency generator (VF generator) which is connected to, for example, a rotator (not illustrated in FIG. 1 but main engines E1 and E2 in FIG. 9 to be described below) and in which a frequency of a generated power is changed according to a rotational speed of the rotator. Additionally or alternatively, the power supply system 1 may include a constant-frequency generator (CF generator) that operates by constant frequency control, as the generator $2i$ having the first drooping characteristics.

The power supply system 1 includes a plurality of power conversion devices $4i$ (of which AC portions $4ia$ are) connected to the plurality of AC wiring portions $3i$, and a DC wiring portion (DC BUS) 6 that connects DC portions $4id$ of the plurality of power conversion devices $4i$. Each power conversion device $4i$ converts an AC power input through each AC wiring portion $3i$ into a DC power, and converts a DC power input through the DC wiring portion 6 into an AC power.

For example, the power conversion device 41 is configured such that the AC power output from the generator 21 connected to the corresponding AC wiring portion 31 is converted into the DC power by the power conversion device 41, the converted DC power is converted into the AC power again by another power conversion device 42 connected to the DC wiring portion 6, and the AC power is applied to another AC wiring portion 32. The power conversion device is configured such that the DC power supplied from the other AC wiring portion 32 via the power conversion device 42 is converted into the AC power by the power conversion device 41 and the converted AC power is supplied to the corresponding AC wiring portion 31. The similar power transfer is also executable in the power conversion device 42.

Each power conversion device $4i$ is, for example, a three-phase inverter that outputs a three-phase AC voltage from a DC voltage, and outputs a DC voltage from a three-phase AC voltage. Each power conversion device $4i$ performs power conversion between the AC power and the DC power by receiving a drive signal So such as a PWM signal decided based on a target value of a predetermined first control element transmitted from a control device 17*i* to be described below and performs a switching operation based on the drive signal So.

Although it has been described in the present embodiment that the DC portions 4*id* of the plurality of power conversion devices 4*i* are connected via the DC BUS, the DC portions 4*id* of the plurality of power conversion devices 4*i* may be directly connected to each other (the directly connected portion is the DC wiring portion 6).

The power supply system 1 includes a plurality of control devices 17*i* that perform power conversion control between the corresponding AC wiring portion 3*i* and the DC wiring portion 6 by transmitting the drive signal So to the power conversion devices 4*i*. In the present embodiment, the plurality of control devices 17*i* is provided so as to correspond to the number of power conversion devices 4*i*. That is, one control device 17*i* controls one power conversion device 4*i*. Alternatively, one control device 17*i* may control the plurality of power conversion devices 4*i*. A generator control device (generator control unit) that performs excitation control and protection control of the generator 2*i* may function as the control device 17*i*.

The control device 17*i* is decides the target value of the first control element such that a relationship of an AC wiring portion voltage Vac with respect to a power conversion device active power Pac (hereinafter, may be simply referred to as active power Pac) output from the power conversion device 4*i* to the AC wiring portion 3*i* corresponding to the generator 2*i* having the first drooping characteristic has a predetermined second drooping characteristic. The control device 17*i* is configured to generate the drive signal So (for example, the PWM signal) for each power conversion device 4*i* by correcting the target value of the first control element according to the DC voltage Vdc at the DC wiring portion 6.

The control device 17*i* can adopt the following current control type control mode as a more specific control mode for performing the aforementioned control. The details are described below.

FIG. 2 is a block diagram illustrating a schematic configuration of a control system in the power supply system illustrated in FIG. 1. FIG. 2 illustrates only one control device 17*i* for one power conversion device 4*i*. The similar control is performed in the control device 17*i* for the other power conversion devices 4*i*. The current control type control device 17*i* controls the power conversion device 4*i* by using, as the first control element, AC currents Id and Iq output from the power conversion device 4*i* to the corresponding AC wiring portion 3*i*.

More specifically, the control device 17*i* includes an active power target value calculation unit 77 that calculates an active power target value Pac_ref by active power target value calculation processing including a calculation for calculating an active power reference value ΔPac_ref by receiving the AC wiring portion voltage Vac of the AC wiring portion 3*i* corresponding to the generator 2*i* having the first drooping characteristic and multiplying a deviation of the AC wiring portion voltage Vac from a predetermined voltage command value Vac_cmd by a coefficient 1/Dr_p indicating the second drooping characteristic. The control device 17*i* converts the active power target value Pac_ref into an AC current target value Id_ref. The control device 17*i* converts a reactive power command value Qac_cmd to an AC current target value Iq_ref. The control device 17*i* controls the corresponding power conversion device 4*i* by using the AC current target values Id_ref and Iq_ref as target values of the first control element.

The power supply system 1 includes a generator voltage measurement device 7 that detects the AC voltage (generator output voltage) output from the generator 2*i*, an AC voltage measurement device 8 that detects the AC voltage (AC wiring portion voltage) of the AC portion 4*ia* of the power conversion device 4*i*, an AC current measurement device 9 that detects the AC current output from the power conversion device 4*i* to the AC wiring portion 4*ia*, and a DC voltage measurement device 10 that detects the DC voltage Vdc of the DC portion 4*id* of the power conversion device 4*i*. A circuit breaker (generator circuit breaker (GCB)) 12 is provided between a connection portion of the generator voltage measurement device 7 and a connection portion of the AC voltage measurement device 8.

For example, a potential transformer (PT) is used as the generator voltage measurement device 7 and the AC voltage measurement device 8, and a current transformer (CT) is used as the AC current measurement device 9. A DC voltage transducer (DCVT) or a detection circuit based on resistance voltage division is used as the DC voltage measurement device 10, for example. The AC voltage measurement device 8 and the AC current measurement device 9 detect instantaneous values va, vb, vc, ia, ib, and is of the phases at the three-phase AC wiring, and the calculation units 71 and 72 to be described below calculate the AC wiring portion voltage Vac and the AC current Iac from the instantaneous values. The generator voltage measurement device 7 detects instantaneous values vga, vgb, and vgc of the three-phase voltage output from the generator 2*i*.

Although it has been described in the present embodiment that the AC current output to the AC wiring portion 3*i* from the power conversion device 4*i* is indirectly detected by detecting the instantaneous values of the phases of the AC current at the wiring portion branched from the corresponding AC wiring portion (AC BUS) 3*i* and the DC voltage Vdc of the DC wiring portion 6 is detected by detecting the DC voltage Vdc at the wiring portion branched from the DC wiring portion (DC BUS) 6, the AC current measurement device 9 may be directly connected to the corresponding AC wiring portion 3*i*, or the DC voltage measurement device 10 may be directly connected to the DC wiring portion 6.

Each value detected by each measurement device 7, 8, 9, or 10 is input to the control device 17*i*. The control device 17*i* includes control blocks of a phase calculation unit 70, a voltage calculation unit 71, a current calculation unit 72, an active power target value calculation unit 77, and a drive signal generation unit 79.

[Phase Calculation Unit]

The phase calculation unit 70 calculates a phase target value φref of each AC wiring portion 3*i*. FIG. 3 is a block diagram illustrating a schematic configuration of the phase calculation unit illustrated in FIG. 2. The phase calculation unit 70 switches between calculation contents of the phase target value φref to be output according to a voltage phase difference between the corresponding generator 2*i* and AC wiring portion 3*i*. In the present embodiment, the phase calculation unit 70 includes a selector 70*a* and a calculation unit 70*b*. The selector 70*a* receives a selection instruction signal SR, and transmits a selection signal SS to the calculation unit 70*b* based on the selection instruction signal. Accordingly, the calculation contents of the calculation unit 70*b* are switched according to the selection signal from the selector 70*a*.

For example, the selector 70*a* may receive, as the selection instruction signal SR, an interruption signal from a detector that detects an interruption operation of the circuit breaker (GCB) 12 and a generator stop signal from the generator 2i or a detector that detects the stop of the generator 2i at the generator control device. Alternatively, an operator may manually perform a state switching operation based on the signals from these detectors, and thus, the selection instruction signal SR may be input to the selector 70a according to the state switching operation.

In the present embodiment, the calculation unit 70b includes three functional blocks 70b1, 70b2, and 70b3, and is configured to execute one of the three functional blocks based on the selection signal SS from the selector 70a. The (instantaneous values va, vb, and vc of) AC wiring portion voltage used in the functional block 70b1 and the (instantaneous value vga, vgb, and vgc of) generator output voltage used in the functional block 70b2 are input to the calculation unit 70b.

When the corresponding generator 2i and AC wiring portion 3i are interconnected, the phase calculation unit 70 calculates the phase target value φref of the corresponding AC wiring portion 3i by a known phase locked loop (PLL) using the instantaneous values va, vb, and vc of the AC wiring portion voltage at the AC wiring portion 3i measured by the AC voltage measurement device 8. The phase calculation unit 70 decides and outputs the phase target value φref by estimating an angular velocity ω from the deviation between the phase φac obtained from the measurement and the phase target value φref which is an output of the PLL calculation and integrating the angular velocity ω.

In the present embodiment, the calculation unit 70b of the phase calculation unit 70 executes the functional block 70b1. The functional block 70b1 calculates the phase target value φref from the instantaneous values va, vb, and vc of the AC wiring portion voltage measured by the AC voltage measurement device 8. Specifically, the functional block 70b1 includes an αβ conversion unit 701, a sine and cosine calculation unit 702, a deviation calculation unit 703, a transfer function application unit 704, and an integration unit 705.

The αβ conversion unit 701 performs αβ conversion on the instantaneous values va, vb, and vc of the AC wiring portion voltage, and outputs two-phase AC voltages vα and vβ. The sine and cosine calculation unit 702 calculates a sine value sin φac and a cosine value cos φac of the phase φac of the AC wiring portion 3i from the two-phase AC voltages vα and vβ. These values are given by the following expression.

[Expression 1]

$$\cos\phi_{ac} = \frac{v_\alpha}{\sqrt{v_\alpha^2 + v_\beta^2}} \quad (1)$$

$$\sin\phi_{ac} = \frac{v_\beta}{\sqrt{v_\alpha^2 + v_\beta^2}} \quad (2)$$

The deviation calculation unit 703 calculates εac which is a deviation ε of the PLL from the sine value sin φac and the cosine value cos φac of the phase φac and a sine value sin φref and a cosine value cos φref (feedback values) of the phase target value φref. The deviation εac is given by the following approximate expression.

[Expression 2]

$$\varepsilon_{ac} = \phi_{ac} - \phi_{ref} \quad (3)$$
$$\approx \sin(\phi_{ac} - \phi_{ref})$$
$$= \sin\phi_{ac}\cos\phi_{ref} - \cos\phi_{ac}\sin\phi_{ref}$$

The transfer function application unit 704 calculates the angular velocity ω based on a transfer function G(s) by using the deviation εac as an input. For example, the transfer function G(s) is given by the following expression. Here, KP indicates a proportional gain, and TI indicates an integration time constant.

[Expression 3]

$$G(s) = K_P\left(1 + \frac{1}{sT_I}\right) \quad (4)$$

The integration unit 705 integrates the angular velocity ω output from the transfer function application unit 704, and calculates the phase target value φref. As described above, the output phase target value φref is fed back to the deviation calculation unit 703, and the PLL calculation is continued unless there is a command to change the functional block by the selector 70a.

When the corresponding generator 2i is stopped (when the generator 2i and the AC wiring portion 3i are interrupted by the circuit breaker 12 (the generator 2i is disconnected)), the phase calculation unit 70 outputs a predetermined value as the phase target value φref. In the present embodiment, the calculation unit 70b of the phase calculation unit 70 executes the functional block 70b3. The functional block 70b3 sets a value Est corresponding to a deviation ε of the PLL to a predetermined value C (for example, C=400). The value Est is input to an angular velocity conversion unit 706.

In the angular velocity conversion unit 706, the transfer function G(s) in the transfer function application unit 704 in the PLL is 2π. Accordingly, the angular velocity conversion unit 706 outputs 2πC which is the angular velocity ω. An output of the angular velocity conversion unit 706 is input to the integration unit 705 and is integrated. An output of the integration unit 705 is output as the phase target value φref.

When the corresponding generator 2i and AC wiring portion 3i are disconnected, for example immediately after the start of the generator 2i, the phase calculation unit 70 calculates the phase target value φref of the corresponding AC wiring portion 3i by the known phase lock loop (PLL) calculation using the instantaneous values vga, vgb, and vgc of the generator voltage measured by the generator voltage measurement device 7. The phase calculation unit 70 decides and outputs the phase target value φref by estimating the angular velocity ω from the deviation between the phase φgen obtained from the measurement and the phase target value φref which is the output of the PLL calculation and integrating the angular velocity ω.

Whether the generator 2i and the AC wiring portion 3i are interconnected or disconnected can be determined by detecting whether the circuit breaker 12 present therebetween is closed or opened. That is, when the circuit breaker 12 between the generator 2i and the AC wiring portion 3i is closed, all wirings between the generator 2i, the AC wiring portion 3i, and the load 5 connected thereto are electrically connected. Therefore, a phase difference is not generated between the wirings. Meanwhile, when the circuit breaker 12 between the generator 2i and the AC wiring portion 3i is opened, the wirings between the generator 2i, the AC wiring portion 3i, and the load 5 connected thereto are not electrically connected. Therefore, the generator voltage and the AC wiring portion voltage generally have different voltage values and phases. The detection of whether the circuit breaker 12 is closed or opened can be performed via an auxiliary contact point provided at the circuit breaker 12. The circuit breaker 12 is switched from an opened state (shut-off state) to a closed state (connected state) after being controlled such that the voltage values and the phases of both the generator voltage and the AC wiring portion voltage are equal (after synchronization) after the generator 2i is started.

In the present embodiment, the calculation unit 70b of the phase calculation unit 70 executes the functional block 70b2. The functional block 70b2 calculates the phase target value φref from the instantaneous values vga, vgb, and vgc of the generator voltage measured by the generator voltage measurement device 7. Similar to the functional block 70b1, the functional block 70b2 includes an αβ conversion unit 701, a sine and cosine calculation unit 702, a deviation calculation unit 703, a transfer function application unit 704, and an integration unit 705. The functional block 70b2 performs the similar PLL calculation to that of the functional block 70b1 except that an input is different. At this time, the sine and cosine calculation unit 702 outputs a sine value sin φgen and a cosine value cos φgen of the phase φgen of the output voltage of the generator 2i. εgen which is the deviation ε input to the transfer function application unit 703 is obtained by replacing φac in Expression (3) with φgen.

In this manner, since the functional blocks 70b1 and 70b2 perform the PLL calculation using the same transfer function G(s) only with different inputs, both the functional blocks may be shared. The functional block 70b3 can be realized by setting the deviation ε to a fixed value, changing the transfer function G(s), and not performing the feedback calculation in the PLL calculation performed by the functional blocks 70b1 and 70b2. Therefore, the functional blocks 70b1, 70b2, and 70b3 may be shared.

FIG. 33 is a block diagram illustrating a schematic configuration of a phase calculation unit according to a modification example of Embodiment 1. Similar to the phase calculation unit 70 of FIG. 3, a phase calculation unit 70B according to the present modification example also includes a calculation unit 70b that includes an αβ conversion unit 701, a sine and cosine calculation unit 702, a deviation calculation unit 703, a transfer function application unit 704, and an integration unit 705. In the example of FIG. 33, the αβ conversion unit 701 and the sine and cosine calculation unit 702 of the functional block 70b1 of FIG. 3 are replaced with an αβ conversion unit 701ac and a sine and cosine calculation unit 702ac, and the αβ conversion unit 701 and the sine and cosine calculation unit 702 of the functional block 70b2 of FIG. 3 are replaced with an αβ conversion unit 701gen and a sine and cosine calculation unit 702gen. The selector 70a is provided within the deviation calculation unit 703, and is configured to select an input value so as to calculate the deviation ε (εac, εgen, or εst) corresponding to a state of the generator 2i. In the example of FIG. 33, εst which is the deviation ε input to the transfer function application unit 704 is 0 when the generator 2i is stopped.

In the example of FIG. 3, since the integration unit 705 is provided in each of the functional blocks 70b1, 70b2, and 70b3, when the selector 70a switches from one functional block to another functional block, it is necessary to adjust the integration unit 705 such that an output of the integration unit 705 does not become discontinuous. Meanwhile, in the example of FIG. 33, the transfer function application unit 704 and the integration unit 705 are shared irrespective of the type of the deviation ε to be selectively input by the selector 70a. Therefore, it is possible to prevent the output of the integration unit 705 from becoming discontinuous without performing the adjustment of the integration unit 705 as described above. In this manner, a method of switching the input deviation ε to be input by sharing the transfer function G(s) is adopted, and thus, it is possible to prevent the angular velocity ω and the phase target value φref from being rapidly changed when the states (stop, disconnection, and interconnection states) of the generator 2i are switched. Therefore, a smooth power interchange operation can be realized even when the states of the generator 2i are switched.

[Voltage Calculation Unit]

The voltage calculation unit 71 calculates the AC wiring portion voltage Vac from the instantaneous values va, vb, and vc of the voltages of the phases detected by the AC voltage measurement device 8 by the following expression.

[Expression 4]

$$V_{ac} = \sqrt{v_a^2 + v_b^2 + v_c^2} \quad (5)$$

The phase calculation unit 71 calculates voltages (d-axis voltage Vd and q-axis voltage Vq) at coordinate axes of rotational coordinates (dq coordinates) of the AC voltage from the instantaneous values va, vb, and vc of the voltages of the phases of the AC wiring portion 3i and the phase target value φref calculated by the phase calculation unit 71 by the following expression.

[Expression 5]

$$\begin{bmatrix} V_d \\ V_q \end{bmatrix} = \sqrt{\frac{2}{3}} \begin{bmatrix} \cos\phi_{ref} & \cos\left(\phi_{ref} - \frac{2}{3}\pi\right) & \cos\left(\phi_{ref} - \frac{4}{3}\pi\right) \\ -\sin\phi_{ref} & -\sin\left(\phi_{ref} - \frac{2}{3}\pi\right) & -\sin\left(\phi_{ref} - \frac{4}{3}\pi\right) \end{bmatrix} \begin{bmatrix} v_a \\ v_b \\ v_c \end{bmatrix} \quad (6)$$

[Current Calculation Unit]

The current calculation unit 72 calculates currents (d-axis current Id and q-axis current Iq) at coordinate axes of rotational coordinate system of the AC current from the instantaneous values ia, ib, and ic of the phases and the phase target value cud calculated by the phase calculation unit 71 by the following expression.

[Expression 6]

$$\begin{bmatrix} I_d \\ I_q \end{bmatrix} = \sqrt{\frac{2}{3}} \begin{bmatrix} \cos\phi_{ref} & \cos\left(\phi_{ref} - \frac{2}{3}\pi\right) & \cos\left(\phi_{ref} - \frac{4}{3}\pi\right) \\ -\sin\phi_{ref} & -\sin\left(\phi_{ref} - \frac{2}{3}\pi\right) & -\sin\left(\phi_{ref} - \frac{4}{3}\pi\right) \end{bmatrix} \begin{bmatrix} i_a \\ i_b \\ i_c \end{bmatrix} \quad (7)$$

[Active Power Target Value Calculation Unit]

The active power target value calculation unit 77 calculates an active power target value Pac_ref based on AC wiring portion voltage Vac calculated by the voltage calculation unit 71. Here, the active power target value calculation unit 77 calculates the active power target value Pac_ref such that a relationship of the AC wiring portion voltage Vac with respect to the active power Pac output from the power conversion device 4i to the corresponding AC wiring portion 3i has a predetermined second drooping characteristic.

Specifically, the active power target value calculation unit 77 calculates the active power reference value ΔPac_ref by multiplying a deviation of the AC wiring portion voltage Vac from a predetermined AC wiring portion voltage command value Vac_cmd by a droop coefficient 1/Dr_p corresponding to the second drooping characteristic. The active power target value calculation unit 77 calculates the active power target value Pac_ref based on the calculated active power reference value ΔPac_ref and a predetermined active power command value Pac_cmd.

At this time, the active power target value calculation unit 77 corrects the active power target value Pac_ref according to the DC voltage Vdc at the DC wiring portion 6. More specifically, the active power target value calculation unit 77 calculates an active power correction value Pac_cmp by multiplying the deviation of the DC voltage Vdc from the predetermined DC voltage command value Vdc_cmd by a predetermined correction coefficient (correction gain: −Kdc). The active power target value calculation unit 77 calculates the active power target value Pac_ref by adding the active power reference value ΔPac_ref and the active power correction value Pac_cmp to the active power command value Pac_cmd.

The control device 17i generates a pair of AC current target values Id_ref and Iq_ref by using the active power target value Pac_ref and the predetermined reactive power command value Qac_cmd. Specifically, the control device 17i calculates the target value Id_ref of the d-axis current output from the power conversion device 4i to the corresponding AC wiring portion 3i by multiplying the active power target value Pac_ref output from the active power target value calculation unit 77 by a predetermined gain Kac. The control device 17i calculates the target value Iq_ref of the q-axis current output from the power conversion device 4i to the corresponding AC wiring portion 3 by multiplying the predetermined reactive power command value Qac_cmd by a predetermined gain (−Kac).

[Drive Signal Generation Unit]

The control device 17i is configured to generate the drive signal such that the phase φac of the AC current matches the phase target value φref by setting the target values of the AC current output from the power conversion device 4i to the corresponding AC wiring portion 3i to the AC current target values Id_ref and Iq_ref. Thus, the drive signal generation unit 79 receives the AC currents Id and Iq, the phase target value φref, and the AC current target values Id_ref and Iq_ref output to the AC wiring portion 3i. The drive signal generation unit 79 obtains the drive signal So such that the AC currents Id and Iq output to the AC wiring portion 3i become the AC current target values Id_ref and Iq_ref, and outputs the obtained drive signal So to the power conversion device 4i. Specifically, the drive signal generation unit 79 calculates the AC voltage target values Vd_ref and Vq_ref from the AC current target values Id_ref and Iq_ref by the following expression. Here, Kd and Kq represent predetermined gains, and Tid and Tiq represent predetermined time constants.

[Expression 7]

$$V_{d\_ref} = Kd\left(1 + \frac{1}{Ti_d * s}\right)(I_{d\_ref} - I_d) \quad (8)$$

$$V_{q\_ref} = Kq\left(1 + \frac{1}{Ti_q * s}\right)(I_{q\_ref} - I_q)$$

The drive signal generation unit 79 calculates target values Va_ref, Vb_ref, and Vc_ref of instantaneous voltages Va, Vb, and Vc of the AC wiring portion 3i which is the three-phase AC from the AC voltage target values Vd_ref and Vq_ref by the following expression.

[Expression 8]

$$\begin{bmatrix} V_{a\_ref} \\ V_{b\_ref} \\ V_{c\_ref} \end{bmatrix} = \sqrt{\frac{2}{3}} \begin{bmatrix} \cos\phi_{ref} & -\sin\phi_{ref} \\ \cos\left(\phi_{ref} - \frac{2}{3}\pi\right) & -\sin\left(\phi_{ref} - \frac{2}{3}\pi\right) \\ \cos\left(\phi_{ref} - \frac{4}{3}\pi\right) & -\sin\left(\phi_{ref} - \frac{4}{3}\pi\right) \end{bmatrix} \begin{bmatrix} V_{d\_ref} \\ V_{q\_ref} \end{bmatrix} \quad (9)$$

FIGS. 4A and 4B are vector diagrams illustrating the relationship between the output voltage of the AC portion of the power conversion device according to the present embodiment, the AC wiring portion voltage, and the AC current output from the power conversion device to the AC wiring portion. FIG. 4A illustrates the vector diagram when the corresponding generator 2i and AC wiring portion 3i are interconnected, and FIG. 4B illustrates the vector diagram when the corresponding generator 2i and AC wiring portion 3i are shut off (when the generator 2i is disconnected).

In FIGS. 4A and 4B, it is assumed that the voltage output from the AC portion 4ia of the power conversion device 4i is Einv, the AC wiring portion voltage is Vac, the AC current output from the power conversion device 4i to the AC wiring portion 3i is Iac, and a filter reactance in an equivalent circuit of the AC portion 4ia is X. In the description of FIGS. 4A and 4B, each value is expressed by per unit based on self capacitance. That is, the voltage, current, and power of the power conversion device 4i have a rated voltage, a rated current, and a rated capacitance of 1 [PU] (per unit), respectively.

In the unit notation, the active power Pac and the reactive power Qac output by the power conversion device 4i are expressed by the following expressions.

[Expression 9]

$$P_{ac} + jQ_{ac} = V_{ac} \cdot I_{ac} \quad (10)$$
$$= (V_d + jV_q)(I_d - jI_q)$$
$$= (V_d I_d + V_q I_q) + j(V_q I_d - V_d I_q)$$

When the generator 2i and the AC wiring portion 3i are interconnected, in a steady state, the AC wiring portion voltage Vac matches a d-axis by a PLL operation as illustrated in FIG. 4A. The AC wiring portion voltage Vac maintains substantially 1 [PU] according to the second drooping characteristic. That is, Vd can be regarded 1, and Vq can be regarded as zero. When these Vd and Vq are substituted into Expression (10), Pac is VdId, and Qac is −VdIq. Therefore, the d-axis current Id and the q-axis current Iq output to the AC wiring portion 3i can be expressed as follows.

[Expression 10]

$$I_d = \frac{P_{ac}}{V_d} = P_{ac} \quad (11)$$

$$I_q = \frac{Q_{ac}}{V_d} = -Q_{ac}$$

From Expression (11), the gains Kac and −Kac to be multiplied by the active power target value Pac_ref and the reactive power command value Qac_cmd in order to obtain the AC current target values Id_ref and Iq_ref are 1/Vac and −1/Vac. When these gains are expressed in the unit notation, Kac is 1, and −Kac is −1. As described above, in the present embodiment, the fixed values (Kac and −Kac) are multiplied in order to generate the pair of AC current target values Id_ref and Iq_ref by using the active power target value Pac_ref and the predetermined reactive power command value Qac_cmd. This is because, the voltage is used as an operation amount in the control system of the power conversion device $4i$, and thus, the control system may become unstable when a voltage measurement value is included within a control loop of the control system. That is, the control system according to the present embodiment is configured to perform the calculation using the fixed value without using the voltage measurement value in order to secure the stability of the system.

In the present embodiment, the reactive power command value Qac_cmd is fixed to, for example, zero. In this case, a q-axis component Iq of the AC current Iac output to the AC wiring portion $3i$ is zero, and the AC current Iac also is present on the d-axis similar to the AC wiring portion voltage Vac. All the reactive power components of the load 5 are borne by the generator $2i$.

Meanwhile, when the generator $2i$ is disconnected from the AC wiring portion $3i$, all the load powers (including the reactive power) of the load 5 is borne by the power conversion device $4i$ as illustrated in FIG. 4B. Here, the q-axis component Iq of the AC current Iac output to the AC wiring portion $3i$ is controlled to be zero. Thus, the AC wiring portion voltage Vac is settled at a position deviated from the d-axis. However, when the phase calculation unit 70 performs the PLL operation (unless the switching using the selector 70a is performed), the frequency (angular velocity ω) at the AC wiring portion $3i$ is increased in order to match the AC wiring portion voltage Vac with the d-axis. As a result obtained by repeating such an operation, the frequency continues to be increased when the generator $2i$ is disconnected.

In general, an operating frequency range of the load 5 connected to the AC wiring portion $3i$ is set in advance. Thus, when the frequency of the AC wiring portion $3i$ exceeds the set frequency range, a stable operation of the load 5 may not be ensured. Therefore, in the present embodiment, the phase calculation unit 70 is configured to use the fixed value in the calculation of the command value without performing the PLL operation when the generator $2i$ is stopped by the switching using by the selector 70a. Accordingly, it is possible to ensure the stable operation of the load 5 by preventing the frequency of the AC wiring portion $3i$ from being excessively increased.

[Operation Description]

As described above, the generator $2i$ is configured such that the relationship of the generator output voltage with respect to the active power output from each generator $2i$ to the corresponding AC wiring portion $3i$ has the predetermined first drooping characteristic. Meanwhile, the control device $17i$ decides the target values (the instantaneous values Va_ref, Vb_ref, and Vc_ref of the AC voltage target values in the present embodiment) of the first control element such that the relationship of the AC wiring portion voltage Vac with respect to the power conversion device active power Pac output from each power conversion device $4i$ to the AC wiring portion $3i$ corresponding to the generator $2i$ has the predetermined second drooping characteristic.

Hereinafter, the power transfer between the two AC wiring portions 31 and 32 illustrated in FIG. 1 will be described. FIG. 5 and FIG. 6 are graphs representing the relationship between the active power and the AC wiring portion voltage at each of the two AC wiring portions. FIG. 5 illustrates a case where there is no correction using the DC voltage Vdc to be described below. In FIGS. 5 and 6, the AC wiring portion voltage at the AC wiring portion 31 is V1ac, the output active power of the power conversion device 41 connected to the AC wiring portion 31 is P1ac, the output active power of the generator 21 connected to the AC wiring portion 31 is P1gen, the power supplied to the load 5 connected to the AC wiring portion 31 is P1, and the relationships therebetween are represented in the left graphs. Similarly, in FIGS. 5 and 6, the AC wiring portion voltage at the AC wiring portion 32 is V2ac, the output active power of the power conversion device 42 connected to the AC wiring portion 32 is P2ac, the output active power of the generator 22 connected to the AC wiring portion 32 is P2gen, the power supplied to the load 5 connected to the AC wiring portion 32 is P2, and the relationships therebetween are represented in the right graphs.

A graph DC1 on a right side of a vertical axis in each of the graphs of FIGS. 5 and 6 represents the first drooping characteristic (a relationship of an AC wiring portion voltage Viac with respect to an active power Pigen output from the generator $2i$), and graphs $DC2_0$ and DC2 on a left side of the vertical axis represent the second drooping characteristic (a relationship of an AC wiring portion voltage Viac with respect to a power conversion device active power Piac). FIGS. 5 and 6 represent a case where the generator $2i$ and the AC wiring portion $3i$ are interconnected.

For example, it is assumed that powers $P1_0$ and $P2_0$ to the load 5 are supplied to the AC wiring portions 31 and 32 as an initial state. In a steady state, the load powers $P1_0$ and $P2_0$ bear the loads only by the corresponding generators 21 and 22 ($P1_0$gen is $P1_0$, $P2_0$gen is $P2_0$, and $P1_0$ac and $P2_0$ac are 0).

It is considered that the power supplied to the load 5 connected to the AC wiring portion 32 from the initial state is increased from $P2_0$ to P2. First, it is assumed that the DC voltage Vdc is no changed as illustrated in FIG. 5. Since the power conversion device active power P2ac is not changed unless the AC wiring portion voltage V2ac is changed, the increase in the load 5 is once borne by the generator 22. As the load on the generator 22 is increased, the AC wiring portion voltage V2ac of the AC wiring portion 32 interconnected with the generator 22 is decreased due to the first drooping characteristic (graph DC1). As the AC wiring portion voltage V2ac is decreased, the power conversion device active power P2ac is increased (is increased from 0 to P2'ac in FIG. 5) due to the second drooping characteristic (graph $DC2_0$), and the settling is performed when both the first and second drooping characteristics are balanced. In FIG. 5, the generator active power P2gen is also increased from $P2_0$gen (=$P2_0$) to P2'gen.

Here, the DC voltage Vdc is actually decreased as the power conversion device active power P2ac is increased. FIG. 6 represents that the graph $DC2_0$ of the second drooping characteristic in the graph related to the AC wiring portion 32 transitions to DC2 by shifting downward (dashed arrow A). As the DC voltage Vdc is decreased, the power is supplied to the DC wiring portion 6 from the AC wiring portion 31 connected to each other via the DC wiring portion 6 through the power conversion device 41.

At this time, the second drooping characteristic related to the AC wiring portion 31 is also shifted according to the shifting of the second drooping characteristic related to the AC wiring portion 32. FIG. 6 represents that the graph $DC2_0$ of the second drooping characteristic in the graph related to the AC wiring portion 31 transitions to DC2 by shifting downward by the same amount as that of the AC wiring portion 32 (dashed arrow A'). As a result, the power conversion device active power P1ac at the AC wiring portion 31 has a negative value. That is, the active power for the P1ac is supplied from the AC wiring portion 31 to the AC wiring portion 32 via the DC wiring portion 6. Thus, the settling is performed when the supply and demand of the DC wiring portion 6 are balanced.

Actually, since a series of these operations are executed almost simultaneously in a short time, the state of FIG. 5 does not occur. Therefore, the power is properly interchanged between the AC wiring portions 31 and 32, and power supply qualities of the AC wiring portions 31 and 32 are maintained at a high level.

As described above, a series of characteristics of the generator 2i and the power conversion device 4i interact with each other, and thus, the power interchange between the AC wiring portions 31 and 32 is realized. Such power interchange is similarly realized not only between the two AC wiring portions 31 and 32 but also when three or more AC wiring portions 3i are connected via the DC wiring portion 6.

As described above, the generator 2i has the first drooping characteristic, and the target value of the first control element for the AC and DC conversion in the power conversion device 4i is decided such that the relationship of the AC wiring portion voltage Vac with respect to the power conversion device active power Pac output from the power conversion devices 4i to the corresponding AC wiring portion 3i has the second drooping characteristic. Accordingly, a power corresponding to a change of the active power at the AC wiring portion 3i due to a load change can be transferred between the plurality of wiring portions 3i regardless of the frequency of the generator 2i. The target value of the first control element is corrected according to DC voltage Vdc at DC wiring portion 6. Accordingly, it is possible to suppress the DC voltage Vdc from being excessively decreased or increased, and it is possible to balance the transfer of the power between the plurality of power conversion devices 4i connected by the common DC wiring portion 6.

In this manner, the plurality of power conversion devices 4i executes the same control mode while taking into account the DC voltage at the DC wiring portion 6, and thus, the power output at each AC wiring portion 3i is controlled. Therefore, the power supply to each wiring portion 3i can be continued when one generator 2i is stopped while executing the same control mode regardless of whether or not the generator 2i is abnormal.

In the phase calculation unit 70, the calculation modes of the phase target value φref are switched when the generator 2i and the AC wiring portion 3i are interconnected, when the generator and the AC wiring portion are disconnected, and when the generator 2i is stopped. Accordingly, even when the phase φgen of the generator voltage Vgen does not match the phase φac of the AC wiring portion voltage Vac, it is possible to calculate an appropriate phase target value φref corresponding to the operation situation.

The power supply system 1 according to the present embodiment has the following effects as more specific effects. That is, first, in the power supply system 1 according to the present embodiment, even when the generator 2i is stopped, since the power conversion device 4i continues to supply the power, instantaneous interruption does not occur. In particular, according to the present embodiment, the instantaneous interruption does not occur even when the generator 2i is suddenly stopped due to a failure and the like.

The power can be interchanged between the plurality of AC wiring portions 3i via the power conversion devices 4i interconnected by the DC wiring portion 6. The amount of power interchange is calculated by the first drooping characteristic of the generator 2i, the second drooping characteristic of the power conversion device 4i, and the correction amount of the output active power using the DC voltage Vdc. The control of the generator 2i and the control of the power conversion device 4i are independent in principle. Therefore, appropriate power interchange is performed even though the generator 2i and the power conversion device 4i are autonomously operating. As a result, according to the power supply system 1 of the present embodiment, an operating rate of the generator 2i can be increased as compared with the variable-frequency power supply system of the related art.

The variable-frequency power supply system of the related art has a problem that the operating rate of the generator cannot be increased. A power supply system that adopts a split type of connecting the plurality of generators to the wiring portions (power supply BUS) independent from each other and supplying the power to the load connected to each wiring portion from one generator, as a method of connecting the generators in the power supply system. For example, in such a split-type power supply system, it is considered that the generators are connected to three wiring portions one by one and the loads having the same capacitance are connected to the three wiring portions.

In the split-type power supply system described above, a bypass circuit from another generator is provided at each wiring portion, and when one generator is stopped, the wiring portion of the stopped generator is configured to receive the power form another generator through the bypass circuit. Therefore, when one of the three generators is stopped, any one of the remaining two generators is bypassed to the wiring portion corresponding to the stopped generator. Therefore, for example, when one generator that outputs 50% of the power to the corresponding load is stopped, another generator connected to be bypassed to this load is limited to the generator that outputs 50% or less of the power at a point of time before the bypass.

In contrast, according to power supply system 1 of the present embodiment, when one of three generators 2i is stopped, the remaining two generators 2i equally share the burden of the stopped generator 2i. Thus, for example, when one generator that outputs 50% of the power to the corresponding load is stopped, a sharing ratio can be flexibly changed according to a load situation of the remaining two generators (the powers output from the three generators 2i are substantially equalized). Therefore, the operating rate of each generator 2i can be increased.

The power supply system 1 according to the present embodiment can suppress voltage fluctuation when the load is suddenly changed. When the voltage fluctuation occurs due to the sudden change of the load 5 connected to the AC wiring portion 3i, since the power interchange is performed between the plurality of AC wiring portions 3i according to this fluctuation, the voltage fluctuation of the generator 2i connected to the AC wiring portion 3i at which the load change occurs can be suppressed.

In the present embodiment, even though a trouble occurs at one AC wiring portion 3i, the trouble hardly affects another AC wiring portion 3i. Since the plurality of AC wiring portions 3*i* is interconnected via the power conversion device 4*i*, even though the trouble such as the failure occurs at a certain AC wiring portion 3*i*, since protection functions (for example, stoppage due to current limiter, overcurrent, and undervoltage) of the plurality of power conversion devices 4*i* are activated, it is possible to suppress the spread of the trouble to another AC wiring portion 3*i*.

When the plurality of power conversion devices 4*i* is connected to the DC wiring portion 6, all of the power conversion devices 4*i* contribute to maintaining the DC voltage Vdc of the DC wiring portion 6. In the control mode of the related art, when the plurality of power conversion devices is interconnected at the DC wiring portion, one power conversion device exclusively maintains the DC voltage of the DC wiring portion, and another power conversion device does not contribute to maintaining the DC voltage. Thus, different control from that of another power conversion device is performed on the power conversion device that maintains the voltage of the DC wiring portion, and the operations in these power conversion devices are restricted. When the power conversion device that maintains the DC voltage is stopped, the DC voltage cannot be maintained, and the function is stopped.

In contrast, in the power supply system 1 according to the present embodiment, all the control devices 17*i* connected to the DC wiring portion 6 correct the target value of the first control element of the power conversion device 4*i* according to the DC voltage Vdc of the DC wiring portion 6, and thus, charge and discharge amounts of the DC wiring portion 6 are adjusted so as to be appropriately maintained. Therefore, the control methods of the plurality of power conversion devices 4*i* connected to one DC wiring portion 6 can all be the same, and even though one of the power conversion devices 4*i* is stopped, the DC voltage Vdc is properly maintained by the remaining power conversion devices 4*i*.

As described above, according to the present embodiment, it is possible to connect the plurality of power conversion devices 4*i* to one DC wiring portion 6, and it is possible to independently control the power conversion devices 4*i*. The control systems of the generator 2*i* and the power conversion device 4*i* are also independent in principle, and are autonomously operated. That is, it is not necessary to adjust the control system in each power conversion device 4*i* and each generator 2*i* in order to realize the power interchange between the plurality of power conversion devices 4*i*. Therefore, it is possible to easily change the power supply configuration dynamically.

In the present embodiment, the wirings can be simplified as compared with the variable-frequency power supply system of the related art. For example, in the split-type power supply system of the related art described above, when one generator is stopped, the bypass circuit for receiving the power from another generator is provided at the corresponding wiring portion. As the number of generators provided in the power supply system is increased, the number of bypass circuits is also increased, and the wirings become complicated. The determination of which generator is to be bypassed becomes complicated.

In contrast, in the present embodiment, since the plurality of power conversion devices 4*i* is interconnected via the DC wiring portion 6, it is not necessary to provide the bypass circuit which has been required when the generator is stopped in the split-type power supply system of the related art. In the present embodiment, when one generator 2*i* is stopped, it is not necessary to determine of which generator 2*i* is to be bypassed to the AC wiring portion 3*i* corresponding to the stopped generator 2*i*.

Embodiment 2

Next, Embodiment 2 of the present invention will be described. FIG. 7 is a block diagram illustrating a schematic configuration of a power supply system according to Embodiment 2 of the present invention. In Embodiment 2, the similar components to those in Embodiment 1 will be denoted by the same reference signs, and description thereof will be omitted. A power supply system 1B according to Embodiment 2 is different from the power supply system 1 according to Embodiment 1 in that at least one (a generator 20; a second generator) of the plurality of generators is configured such that a relationship of a frequency fac with respect to the generator active power Pac output from the generator 20 to the corresponding AC wiring portion 31 has a predetermined third drooping characteristic. The generator 20 having the third drooping characteristic is, for example, a constant-frequency generator (CF generator) that operates by constant frequency control.

A control device 170 of the power conversion device 41 connected to the AC wiring portion (second AC wiring portion) 31 to which the generator 20 is connected is configured to decide a target value of a second control element such that a relationship of the frequency fac with respect to the power control device active power Pac output from the power conversion device 41 to the wiring portion 31 corresponding to the generator 20 having the third drooping characteristic has a predetermined fourth drooping characteristic, and generate the drive signal So for the power conversion device 41 by correcting the target value of the second control element according to the DC voltage Vdc at the DC wiring portion 6.

In the present embodiment, similar to the power generator 2*i* according to Embodiment 1, the power generator 22 has the first drooping characteristic, and a control device 172 of the power conversion device 42 connected to the AC wiring portion 32 to which the power generator 22 is connected performs the similar control to that of the control device 17*i* (FIG. 2) according to Embodiment 1.

FIG. 8 is a block diagram illustrating a schematic configuration of a control system of the power conversion device 41 corresponding to the generator 20 having the third drooping characteristic in the power supply system 1B illustrated in FIG. 7. In FIG. 8 and the following description, control devices 170A and 170B in FIG. 7 are collectively referred to as the control device 170. The control device 170 of the power conversion device 41 also controls the power conversion device 41 by using, as the second control element, the AC currents Id and Iq output from the power conversion device 41 to the corresponding AC wiring portion 3*i*. More specifically, the control device 170 includes an active power target value calculation unit 770 that calculates the active power target value Pac_ref by the active power target value calculation processing for obtaining the active power reference value ΔPac_ref by multiplying the deviation of the frequency fac from the predetermined frequency command value fac_cmd by the coefficient 1/Dr_p indicating the fourth drooping characteristic.

The control device 170 converts the active power target value Pac_ref into the AC current target value Id_ref, and controls the corresponding power conversion device 4*i* by using one of the target values of the second control element. The control device 170 and the control device 172 (the configuration in FIG. 2) of the power conversion device 42 connected to the AC wiring portion 32 to which the generator 22 is connected may be constituted independently of each other, or may be constituted by a plurality of functional blocks in one control device.

The values detected by the AC voltage measurement device 8, the AC current measurement device 9, and the DC voltage measurement device 10 are input to the control device 170, similar to the control device 17i. The control device 170 includes control blocks of a voltage and frequency and phase calculation unit 710, a current calculation unit 720, an active and reactive power calculation unit 730, an active power target value calculation unit 770, a reactive power target value calculation unit 780, and a drive signal generation unit 790.

[Voltage and Frequency and Phase Calculation Unit]

Similar to the voltage calculation unit 71 of the control device 17i, the voltage and frequency and phase calculation unit 710 calculates the AC wiring portion voltage Vac from the instantaneous values va, vb, and vc of the voltages of the phases detected by the AC voltage measurement device 8 by Expression (5). The voltage and frequency and phase calculation unit 71 calculates the frequency fac and the phase φac of the corresponding AC wiring portion 3i by the known phase lock loop (PLL) calculation. The voltage and frequency and phase calculation unit 710 calculates the voltages (d-axis voltage Vd and q-axis voltage Vq) on the coordinate axes of the rotational coordinate system (dq coordinates) of the AC voltage from the instantaneous values va, vb, and vc of the voltages of the phases and the phase φac. A calculation expression is obtained by replacing φref in Expression (6) with φac.

[Current Calculation Unit]

The current calculation unit 720 calculates the currents (d-axis current Id and q-axis current Iq) on the coordinate axes of the rotational coordinate system of the AC current from the instantaneous currents ia, ib, and is of the phases and the phase φac calculated by the voltage and frequency and phase calculation unit 710. The calculation expression is obtained by replacing φref in Expression (7) with φac.

[Active and Reactive Power Calculation Unit]

The active and reactive power calculation unit 730 calculates the corresponding power conversion device active power Pac and power conversion device reactive power Qac from the voltages Vd and Vq calculated by the voltage and frequency and phase calculation unit 710 and the currents Id and Iq calculated by the current calculation unit 720 by the following expression.

[Expression 11]

$$Pac = Vd \cdot Id + Vq \cdot Iq \quad (12)$$
$$Qac = -(Vd \cdot Iq - Vq \cdot Id)$$

[Active Power Target Value Calculation Unit]

The active power target value calculation unit 770 calculates the active power target value Pac_ref based on the frequency fac calculated by the voltage and frequency and phase calculation unit 710. Here, the active power target value calculation unit 770 calculates the active power target value Pac_ref such that the relationship of the frequency fac with respect to the active power Pac output from the power conversion device 41 to the corresponding AC wiring portion 31 has the predetermined fourth drooping characteristic.

Specifically, the active power target value calculation unit 770 calculates the active power reference value ΔPac_ref by multiplying the deviation of the frequency fac from the predetermined frequency command value fac_cmd by the droop coefficient 1/Dr_p corresponding to the fourth drooping characteristic. The active power target value calculation unit 770 calculates the active power target value Pac_ref based on the calculated active power reference value ΔPac_ref and the predetermined active power command value Pac_cmd.

At this time, the active power target value calculation unit 770 corrects the active power target value Pac_ref according to the DC voltage Vdc at DC wiring portion 6. More specifically, the active power target value calculation unit 770 calculates the active power correction value Pac_cmp by multiplying the deviation of the DC voltage Vdc from the predetermined DC voltage command value Vdc_cmd by the predetermined correction coefficient (correction gain) (−Kdc). The active power target value calculation unit 770 calculates the active power target value Pac_ref by adding the active power reference value ΔPac_ref and the active power correction value Pac_cmp to the active power command value Pac_cmd.

[Reactive Power Target Value Calculation Unit]

In the present embodiment, the control device 170 is configured to decide the target value Qac_ref of the reactive power Qac such that the relationship of the power conversion device reactive power Qac with respect to the AC wiring portion voltage Vac corresponding to the power conversion device 41 has a predetermined fifth drooping characteristic.

The reactive power target value calculation unit 780 calculates the reactive power target value Qac_ref based on the AC wiring portion voltage Vac calculated by the voltage and frequency and phase calculation unit 71. Here, the reactive power target value calculation unit 780 calculates the reactive power target value Qac_ref such that the relationship of the AC wiring portion voltage Vac with respect to the reactive power Qac output from the power conversion device 41 to the corresponding AC wiring portion 31 has the predetermined fifth drooping characteristic.

Specifically, the reactive power target value calculation unit 780 calculates the reactive power reference value ΔQac_ref by multiplying the deviation of the AC wiring portion voltage Vac from the predetermined AC voltage command value Vac_cmd by the droop coefficient 1/Dr_q corresponding to the fifth drooping characteristic. The reactive power target value calculation unit 780 calculates the reactive power target value Qac_ref by adding the reactive power reference value ΔQac_ref to the predetermined reactive power command value Qac_cmd.

The control device 170 generates a pair of AC current target values Id_ref and Iq_ref by using the active power target value Pac_ref and the reactive power target value Qac_ref. Specifically, the control device 170 calculates the target value Id_ref of the d-axis current output from the power conversion device 41 to the corresponding AC wiring portion 31 by multiplying the active power target value Pac_ref output from the active power target value calculation unit 770 by the predetermined gain Kac. The control device 170 calculates the target value Iq_ref of the q-axis current output from the power conversion device 41 to the corresponding AC wiring portion 31 by multiplying the reactive power target value Qac_ref output from the reactive power target value calculation unit 780 by the predetermined gain (−Kac).

[Drive Signal Generation Unit]

The control device 170 is configured to generate the drive signal using the AC current target values Id_ref and Iq_ref as the target values of the AC current output from the power conversion device 41 to the corresponding AC wiring portion 31 and the phase φac of the AC current. Thus, the AC currents Id and Iq, the phase target value φac, and the AC current target values Id_ref and Iq_ref output to the AC wiring portion 3i are input to the drive signal generation unit 790. The drive signal generation unit 790 obtains the drive signal So such that the AC currents Id and Iq output to the AC wiring portion 31 become the AC current target values Id_ref and Iq_ref, and outputs the drive signal So to the power conversion device 41. Specifically, the drive signal generating unit 790 calculates the AC voltage target values Vd_ref and Vq_ref from the AC current target values Id_ref and Iq_ref by the following expression. Here, Kd and Kq represent predetermined gains, and Tid and Tiq represent predetermined time constants.

[Expression 12]

$$V_{d\_ref} = Kd\left(1 + \frac{1}{Ti_d * s}\right)(I_{d\_ref} - I_d) \quad (13)$$

$$V_{q\_ref} = Kq\left(1 + \frac{1}{Ti_q * s}\right)(I_{q\_ref} - I_q)$$

The drive signal generation unit 790 calculates the target values Va_ref, Vb_ref, and Vc_ref of the instantaneous voltages Va, Vb, and Vc of the AC wiring portion 31 which is the three-phase AC from the AC voltage target values Vd_ref and Vq_ref by the following expression.

[Expression 13]

$$\begin{bmatrix} V_{a\_ref} \\ V_{b\_ref} \\ V_{c\_ref} \end{bmatrix} = \sqrt{\frac{2}{3}} \begin{bmatrix} \cos\phi_{ac} & -\sin\phi_{ac} \\ \cos\left(\phi_{ac} - \frac{2}{3}\pi\right) & -\sin\left(\phi_{ac} - \frac{2}{3}\pi\right) \\ \cos\left(\phi_{ac} - \frac{4}{3}\pi\right) & -\sin\left(\phi_{ac} - \frac{4}{3}\pi\right) \end{bmatrix} \begin{bmatrix} V_{d\_ref} \\ V_{q\_ref} \end{bmatrix} \quad (14)$$

The relationship between the output voltage of the AC portion of the power conversion device 41 and the AC current output from the AC wiring portion and the power conversion device 41 to the AC wiring portion 31 is similar to the relationship illustrated in FIGS. 4A and 4B.

That is, when the generator 20 and the AC wiring portion 31 are interconnected, in the steady state, the AC wiring portion voltage Vac matches the d-axis by the PLL operation as illustrated in FIG. 4A. The AC wiring portion voltage Vac maintains approximately 1 [PU] according to the fifth drooping characteristic. That is, Vd can be regarded 1, and Vq can be regarded as zero. Therefore, as described in Embodiment 1, the d-axis current Id and the q-axis current Iq output to the AC wiring portion 31 can be expressed by Expression (11).

That is, the gains Kac and −Kac multiplied by the active power target value Pac_ref and the reactive power target value Qac_ref in order to obtain the AC current target values Id_ref and Iq_ref are 1/Vac and −1/Vac. When these gains are expressed in the unit notation, Kac is 1, and −Kac is −1. As described above, in the present embodiment, the fixed values (Kac and −Kac) are multiplied in order to generate the pair of AC current target values Id_ref and Iq_ref by using the active power target value Pac_ref and the predetermined reactive power command value Qac_cmd. This is because, the voltage is used as an operation amount in the control system of the power conversion device 41, and thus, the control system may become unstable when a voltage measurement value is included within a control loop of the control system. That is, the control system according to the present embodiment is configured to perform the calculation using the fixed value without using the voltage measurement value in order to secure the stability of the system.

The drive signal generation unit 790 obtains the drive signal So such that the AC currents Id and Iq of the AC wiring portion 31 become the AC current target values Id_ref and Iq_ref, and outputs the obtained drive signal So to the power conversion device 41. Specifically, similar to the drive signal generation unit 79 of the control device 17i, the drive signal generation unit 790 calculates the target values Va_ref, Vb_ref, and Vc_ref of the instantaneous voltages Va, Vb, and Vc of the AC wiring portion 31 which is the three-phase AC. The calculation expression is obtained by replacing φref with φac in Expressions (8) and (9).

Accordingly, in the generator 20 of the constant frequency control, the target value of the second control element for the AC and DC conversion in the power conversion device 41 is decided such that the relationship of the frequency fac with respect to the power conversion device active power Pac output by the power conversion device 41 to the corresponding AC wiring portion 31 has the fourth drooping characteristic. Therefore, the transfer of the power can be performed between an AC power supply system to which the generator 22 of which the frequency fac is variably controlled is connected and an AC power supply system to which the generator 20 of which the frequency fac is fixedly controlled is connected. Even in this case, the power conversion devices 41 and 42 can be independently controlled. Therefore, the power supply system can be selected according to the characteristics of the load, and a more efficient device configuration can be achieved.

When there is an attempt to realize the power supply system in which a VF generator and a CF generator are mixed by the split type of the related art, there are the following problems. That is, when the VF generator is stopped, the corresponding load can be connected to the CF generator, but devices designed on the assumption that the frequency is constant cannot be driven by the VF generator. Thus, when the CF generator is stopped, the backup through the connection of the corresponding load to the VF generator cannot be performed.

In contrast, in accordance with the power supply system 1B according to the present embodiment, it is possible to interchange the power even between the VF generator 22 and the CF generator 20. Since a variable-frequency AC power supply system (AC wiring portion 32), a constant-frequency AC power supply system (AC wiring portion 31), and a DC power supply system (DC wiring portion 6, and see Application Example 2 of FIG. 30 and Application Example 5 of FIG. 32 to be described below) can be used, the power supply BUS to be connected can be selected according to the characteristics of the loads 5 and 5D. Accordingly, a more efficient device configuration can be obtained.

For example, the load 5 requiring the constant-frequency power supply such as an electric motor is connected to the constant-frequency AC power supply system. The load 5 that does not depend on the frequency such as a resistance load is connected to the variable-frequency AC power supply system. The load 5D requiring the DC power supply such as an inverter, an actuator, and a control circuit is connected to the DC power supply system. Accordingly, it is possible to omit extra power conversion circuits on the loads 5 and 5D side.

Although it has been described in the present embodiment that the control mode of the power conversion device 41 connected to the CF generator 20 is performed in the control mode different from that of the power conversion device 42 connected to the VF generator 22, the control mode of the power conversion device 41 connected to the CF generator 20 may be alternatively controlled in the same manner as the power conversion device 42 connected to the VF generator 22. That is, similar to the power conversion device 41 according to Embodiment 1, the power conversion device 41 according to the present embodiment may be controlled by using the target value of the first control element decided such that the relationship of the AC wiring portion voltage Vac with respect to the power conversion device active power Pac has the predetermined second drooping characteristic.

[Simulation Result]

Simulation results of the power supply system according to the aforementioned embodiments are illustrated below. FIG. 9 is a block diagram illustrating a configuration example for a simulation of the power supply system according to Embodiment 1. In FIG. 9, similar components to those of FIG. 1 will be denoted by the same reference signs, and description thereof will be omitted. In the following simulations of cases 1 to 4, a power supply system 1S in which the VF generators (first generators) 21 to 24 are connected to the four AC wiring portions (first AC wiring portions) 31 to 34 is used as illustrated in FIG. 9. The four AC wiring portions 31 to 34 are connected to each other via one DC wiring portion 6. Two of the four generators 21 to 24 are provided for each of two main engines E1 and E2. That is, the generators 21 and 22 are configured to generate the power based on the rotational power of the main engine E1, and the generators 23 and 24 are configured to generate the power based on the rotational power of the main engine E2. The capacitance and the rated voltage (line voltage) of each of the generators 21 to 24 and each of the power conversion devices 41 to 44 are 150 kVA and 400 Vrms.

[Case 1]

In case 1, an operation when an initial state is a state in which a load of 50% (75 kW) is applied to each of the four AC wiring portions 31 to 34 and the load of the AC wiring portion 31 is changed from 50% to 100% (150 kW) was simulated. FIGS. 10 to 12 are graphs illustrating results of the simulation (case 1) in the power supply system 1S illustrated in FIG. 9.

FIG. 10 is the graph illustrating time changes of a power conversion device active power CNV1 output from the power conversion device 41 to the AC wiring portion 31 (AC BUS 1), a generator active power GEN1 output from the corresponding generator 21, and an active power LOAD1 of the load 5 in case 1. FIG. 11 is the graph illustrating time changes of a power conversion device active power CNV2 output from the power conversion device 42 to the AC wiring portion 32 (AC BUS 2), a generator active power GEN2 output from the corresponding generator 22, and an active power LOAD2 of the load 5 in case 1. Time changes of the values of the other AC wiring portions 33 and 34 have the similar result to that of FIG. 11, and thus, the description thereof will be omitted. FIG. 12 is the graph illustrating a time change of the DC voltage (DC BUS) of the DC wiring portion 6 in case 1. In FIG. 12, the voltage is represented in the unit notation (Per Unit) when the rated voltage set is 1.

At the start of the simulation, since the active powers of the loads 5 of the AC wiring portions 31 to 34 are equal (LOAD1 is LOAD2), the power interchange between the AC wiring portions 31 to 34 does not occur. Therefore, the power conversion device active powers CNV1 and CNV2 output by the power conversion devices 41 to 44 are all zero, and the active powers required for the loads 5 are covered by the active powers generated by the corresponding generators 21 to 24 (GEN1=GEN2=75 kW).

As illustrated in FIG. 10, after one second elapses from the start of the simulation, the load 5 of the AC wiring portion 31 is increased from 50% (75 kW) to 100% (150 kW). At this time, the power conversion device active power CNV1 of the AC wiring portion 31 is changed from 0 to 50 kW, and the generator active power GEN1 of the corresponding generator 21 is increased to 100 kW by 25 kW. That is, it can be seen that 50 kW which is the active power obtained by subtracting 25 kW which is the increase amount of the generator active power GEN1 of the generator 21 from 75 kW which is the increase amount of the active power LOAD1 of the load 5 is supplied to the AC wiring portion 31 from another AC wiring portions 32 to 34 via the DC wiring portion 6.

Such power supply can be understood from the fact that the generator active power GEN2 of the generator 22 corresponding to the AC wiring portion 32 in FIG. 11 is increased by about 17 kW and is changed to about 92 kW and the power conversion device active power CNV2 of the AC wiring portion 32 becomes about −17 kW. That is, the generator active powers of the generators 22 to 24 corresponding to the other AC wiring portions 32 to 34 are increased by about 17 kW, and thus, a total of 50 kW of active power is supplied from the other AC wiring portions 32 to 34 to the AC wiring portion 31. At this time, the DC voltage is also maintained in an appropriate range as illustrated in FIG. 12.

In this manner, as the active power LOAD1 of the load 5 at the AC wiring portion 31 is increased, the generator active power GEN1 of the corresponding generator 21 is increased by 25 kW, and the generator active powers GEN2 of the generators 22 to 24 corresponding to the other AC wiring portions 32 to 34 are increased by about 17 kW. Accordingly, the load sharing of the generators 21 to 24 is substantially uniformized by the power interchange via the power conversion devices 41 to 44. Therefore, a parallel operation using the plurality of generators that cannot be realized by the variable-frequency power supply system of the related art can be equivalently realized.

[Case 2]

In case 2, an operation when the loads 5 of the AC wiring portions 31 to 34 are changed step-wisely from the similar initial state to that in case 1 was simulated. FIGS. 13 to 16 are graphs illustrating the results of the simulation (case 2) in the power supply system 1S illustrated in FIG. 9.

FIG. 13 is the graph illustrating time changes of the active powers LOAD1 to LOAD4 for the loads 5 connected to the AC wiring portions 31 to 34 in case 2. FIG. 14 is the graph illustrating time changes of the power conversion device active powers CNV1 to CNV4 output to the corresponding AC wiring portions 31 to 34 by the power conversion devices 41 to 44 in case 2. FIG. 15 is the graph illustrating time changes of the generator active powers GEN1 to GEN4 of the generators 21 to 24 in case 2. FIG. 16 is the graph illustrating a time change of the DC voltage (DC BUS) of the DC wiring portion 6 in case 2 in the unit notation.

As illustrated in FIG. 13, whenever the active powers of the loads 5 connected to the AC wiring portions 31 to 34 are changed, it can be seen that the power interchange using the power conversion devices 41 to 44 occurs as illustrated in FIGS. 14 and 15. As a result of the power interchange, the load sharing of the generators 21 to 24 at each time is substantially uniformized as illustrated in FIG. 15. At this time, the DC voltage is also maintained in an appropriate range as illustrated in FIG. 16.

[Case 3]

In case 3, an operation when the generator 21 connected to the AC wiring portion 31 is disconnected (the generator 21 is stopped) from the similar initial state to that in case 1 was simulated. FIGS. 17 to 19 are graphs illustrating the results of the simulation (case 3) in the power supply system 1S illustrated in FIG. 9.

FIG. 17 is the graph illustrating time changes of the power conversion device active power CNV1 output from the power conversion device 41 to the AC wiring portion 31 (AC BUS 1), the generator active power GEN1 of the corresponding generator 21, and the active power LOAD1 of the load 5 in case 3. FIG. 18 is the graph illustrating time changes of the power conversion device active power CNV2 output from the power conversion device 42 to the AC wiring portion 32 (AC BUS 2), the generator active power GEN2 of the corresponding generator 22, and the active power LOAD2 of the load 5 in case 3. Time changes of the values of the other AC wiring portions 33 and 34 have the similar result as that of FIG. 18, and thus, the description thereof will be omitted. FIG. 19 is the graph illustrating the time change of the frequency of the AC wiring portion 31 (AC BUS 1) in case 3.

In the present case 3, the generator 21 is disconnected after one second from the start of the simulation. After 0.1 seconds from the disconnection of the generator 21, the value corresponding to the phase deviation ε of the PLL is changed to the fixed value 0 in the phase calculation unit 70 of the control device 171 of the corresponding power conversion device 41.

As illustrated in FIG. 17, after one second from the start of the simulation, the generator 21 is disconnected, and the generator active power GEN1 becomes zero. Instead, the power conversion device active power CNV1 output from the power conversion device 41 to the AC wiring portion 31 is increased from 0 to 75 kW so as to supplement the active power LOAD1 of the corresponding load 5. As a result, the active power LOAD1 to the load 5 is continuously supplied without interruption. At this time, the other AC wiring portions 32 to 34 supply the power to the AC wiring portion 31 via the power conversion device 41.

As a result, as illustrated in FIG. 18, the generator active power GEN2 of the generator 22 is increased by 25 kW and is changed to 100 kW, and the power conversion device active power CNV2 output from the power conversion device 42 to the AC wiring portion 32 becomes from 0 to −25 kW. The similar operation is performed in the generators 23 and 24 and the AC wiring portions 33 and 34, and as a result, the same power conversion device active power of 75 kW as that of the load 5 connected to the AC wiring portion 31 is supplied to the AC wiring portion 31 as a whole. In this manner, it can be seen that the generators 22 to 24 corresponding to the other AC wiring portions 32 to 34 equally share the load 5 connected to the AC wiring portion 31.

Here, as illustrated in FIG. 19, the frequency of the AC wiring portion 31 is hardly changed before and after the generator 21 is disconnected. As described above, in the present case 3, the control is performed such that the phase deviation ε of the PLL is fixed to zero after 0.1 seconds from the disconnection of the generator 21. FIG. 19 illustrates that the frequency of the corresponding AC wiring portion 31 is prevented from becoming unstable by such control.

[Case 4]

In case 4, an operation when the load of the AC wiring portion 31 is changed from 50% to 100% (150 kW) from the similar initial state to that in case 1 and then the generator 21 of the AC wiring portion 31 is disconnected was simulated. FIGS. 20 to 22 are graphs illustrating the results of the simulation (case 4) in the power supply system 1S illustrated in FIG. 9.

FIG. 20 is the graph illustrating time changes of the power conversion device active power CNV1 output from the power conversion device 41 to the AC wiring portion 31 (AC BUS 1), the generator active power GEN1 of the corresponding generator 21, and the active power LOAD1 of the load 5 in case 4. FIG. 21 is the graph illustrating time changes of the power conversion device active power CNV2 output from the power conversion device 42 to the AC wiring portion 32 (AC BUS 2), the generator active power GEN2 of the corresponding generator 22, and the active power LOAD2 of the load 5 in case 4. Time changes of the values of the other AC wiring portions 33 and 34 have the same result as that of FIG. 21, and thus, the description thereof will be omitted. FIG. 22 is the graph illustrating a time change of the frequency of the AC wiring portion 31 (AC BUS 1) in the case 4.

In the present case 4, the load 5 of the AC wiring portion 31 is changed from 50% to 100% after one second since the start of the simulation. After three seconds from the start of the simulation, the generator 21 is disconnected. After 0.1 seconds from the disconnection of the generator 21, the value corresponding to the phase deviation ε of the PLL is changed to the fixed value 0 in the phase calculation unit 70 of the control device 171 of the corresponding power conversion device 41.

The operations of the AC wiring portion 31 before and after the load is increased are similar to those in case 1, and the operations before and after the generator 21 is disconnected are similar to those in case 3. However, the present case 4 is a condition that cannot be satisfied by the method of the related art in which the other AC wiring portions need to be bypassed when the generator is stopped. That is, in the method of the related art, when there is an attempt to bypass any one of the generators 22 to 24 connected to the other AC wiring portions 32 to 34 to the AC wiring portion 31, the load on the generator exceeds 100%, and thus, the load is overloaded.

Meanwhile, in the present embodiment, even after the power generator 21 is disconnected, the power conversion device active power CNV1 output to the AC wiring portion 32 (and the AC wiring portions 33 and 34) is also less than 150 kW (100%) as illustrated in FIG. 21. That is, it can be seen that the power interchange from the other AC wiring portions 32 to 34 to the AC wiring portion 31 occurs immediately after the generator 21 is disconnected and the load sharing using the plurality of generators 22 to 24 can be realized. In this manner, in the present case 4, the power can be continuously supplied to all the loads 5 without performing control such as the selection of the generator to be bypassed and the load interruption for preventing the overloading.

[Case 5]

FIG. 23 is a block diagram illustrating a configuration example for a simulation of the power supply system according to Embodiment 2. In FIG. 23, the similar components to those of FIGS. 1 and 9 will be denoted by the same reference signs, and description thereof will be omitted. In the following case 5, as illustrated in FIG. 23, a power supply system 1T in which constant-frequency generators (CF generators, second generators) 20B and 20A are connected two AC wiring portions (second AC wiring portions) 32 and 33 of the four AC wiring portions 31 to 34 one by one, and the variable-frequency generators (VF generators, first generators) 21 and 24 are connected to the remaining two AC wiring portions (first AC wiring portions) 31 and 34 one by one is used. The four AC wiring portions 31 to 34 are connected to each other via one DC wiring portion 6. The CF generators 20B and 20A and the VF generators 21 and 24 are provided for each of the engines E1 and E2 one by one. That is, the CF generator 20B and the VF generator 21 are provided at the engine E1, and the CF generator 20A and the VF generator 24 are provided at the engine E2.

Similar to case 2, in case 5, an operation when the loads 5 of the AC wiring portions 31 to 34 are changed step-wisely from the similar initial state to that in case 1 was simulated. FIGS. 24 to 27 are graphs illustrating the results of the simulation (case 5) in the power supply system 1T illustrated in FIG. 23.

FIG. 24 is the graph illustrating time changes of the active powers (VF BUS LOAD1, VF BUS LOAD2, CF BUS LOAD1, and CF BUS LOAD2) for the loads 5 connected to the AC wiring portions 31 to 34 in case 5. VF BUS LOAD1 indicates the active power of the load 5 connected to the AC wiring portion 31, VF BUS LOAD2 indicates the active power of the load 5 connected to the AC wiring portion 34, and CF BUS LOAD1 indicates the active power of the load 5 connected to the AC wiring portion 33, and the CF BUS LOAD2 indicates the active power of the load 5 connected to the AC wiring portion 32.

FIG. 25 is the graph illustrating time changes of the power conversion device active powers (VF BUS CNV1, VF BUS CNV2, CF BUS CNV1, and CF BUS CNV2) output from the power conversion devices 41 to 44 to the corresponding AC wiring portions 31 to 34 in case 5. A correspondence between the reference signs in the graphs and the AC wiring portions 31 to 34 is similar to that of FIG. 24. FIG. 26 is a graph illustrating time changes of the generator active powers (VF BUS GEN1, VF BUS GEN2, CF BUS GEN1, and CF BUS GEN2) of the VF generators 21 and 24 and the CF generators 20B and 20A in case 5. FIG. 27 is the graph illustrating a time change of the DC voltage (DC BUS) of the DC wiring portion 6 in case 5 in the unit notation.

Similar to case 2, in the present case 5, it can be seen that whenever the active powers of the loads 5 connected to the AC wiring portions 31 to 34 are changed as illustrated in FIG. 24, the power interchange occurs via each of the power conversion devices 41 to 44 as illustrated in FIGS. 25 and 26. As a result of the power interchange, the load sharing of the generators 20A, 20B, 21, and 24 at each time is substantially uniformized as illustrated in FIG. 26. At this time, as illustrated in FIG. 27, the DC voltage is also maintained in an appropriate range.

In the comparison of the simulation result with case 2, in case 5, there is a difference in a transient response at the time of the load change (a time until the settling is longer than that in case 2), but a response in a settled state almost matches that in case 2. Therefore, appropriate power interchange can be performed even when different power supply systems are connected via the DC wiring portion 6.

Application Example 1

Hereinafter, some application examples of the power supply systems 1 and 1B according to the aforementioned embodiments will be described.

First, a case where the power supply system 1 is applied as a power supply system of an aircraft will be described.

FIG. 28 is a block diagram for describing one of application examples of the power supply system according to Embodiment 1 to the aircraft. In FIG. 28, the similar components to those of FIGS. 1 and 9 will be denoted by the same reference signs, and description thereof will be omitted. A power supply system 1C in FIG. 28 includes six generators 21 to 26 connected to the individual AC wiring portions 31 to 36. The generators 21 to 24 are variable-frequency generators (VF generators) in which the frequency of the generated power is changed according to the rotational speeds of the main engines E1 and E2. The remaining generators 25 and 26 are generators built in a transmission integrated drive generator (IDG) that generate the power based on a rotational power of an auxiliary power unit (APU) (not illustrated). That is, the generators 25 and 26 are constant-frequency generators (CF generators). The load 5 is not connected to the generators 25 and 26.

The CF generators 25 and 26 also operate as generators (first generators) having the first drooping characteristics. That is, similar to the other control devices 171 to 174, control devices 175 and 176 of power conversion devices 45 and 46 corresponding to the CF generators 25 and 26 decide the target value of the first control element such that the relationship of the AC wiring portion voltage Vac with respect to the power conversion device active power Pac has the predetermined second drooping characteristic, and corrects the target value of the first control element according to the DC voltages Vdc at DC wiring portions 61 and 62.

In addition, the DC wiring portion 61 is connected to the DC portions of the power conversion devices 41, 42, and 45 to which the AC wiring portions 31, 32, and 35 are connected, and the DC wiring portion 62 is connected to the DC portions of the power conversion devices 43, 44, and 46 to which the AC wiring portions 33, 34, and 36 are connected. These two DC wiring portions 61 and 62 are connected to each other via a bypass circuit 63. A circuit breaker 110 is provided in the bypass circuit 63. Circuit breakers 111 to 116 are provided between the DC wiring portions 61 and 62 and the power conversion devices 41 to 46.

In the present application example, a maximum of six generators 21 to 26 can share the loads 5 of the four AC wiring portions 31 to 34. Accordingly, it is possible to suppress the voltage and frequency fluctuations when the load is suddenly changed. Even though one of the generators 2i (i=1 to 6) is stopped, it is possible to continue to supply the power to all the loads 5 by the other generators 2i. Further, the connection and interruption of circuit breakers 11i provided between the circuit breaker 110 of the bypass circuit 63 and/or the power conversion devices 4i and the DC wiring portions 61 and 62 are switched, and thus, it is possible to easily change the configuration of the power supply system 1C such as whether the load 5 connected to one AC wiring portion 3i is borne by one generator 2i or the plurality of generators 2i.

As in the example of FIG. 28, even when a plurality of types of generators 2i having different control modes is connected to the plurality of AC wiring portions 3i, it is possible to control the power conversion devices 4i in the same control mode. Therefore, the power interchange can be realized by maximally utilizing the plurality (six) of generators 2i provided in the aircraft.

In the example of FIG. 28, the generators 21 and 22 that generate the power based on the rotational power of one engine E1 are connected to the power conversion devices 41 and 42 connected to one DC wiring portion 61, and the generators 23 and 24 that generate the power based on the rotational power of the other engine E2 are connected to the power conversion devices 43 and 44 connected to the other DC wiring portion 62. Instead, the generators 21 and 22 that generate the power based on the rotational power of one engine E1 are connected to the power conversion device 41 connected to the DC wiring portion 61 and the power conversion device 43 connected to the DC wiring portion 62, and the generators 23 and 24 that generate the power based on the rotational power of the other engine E2 are connected to the power conversion device 42 connected to the DC wiring portion 61 and the power conversion device 44 connected to the DC wiring portion 62.

Application Example 2

FIG. 29 is a block diagram for describing another one of the application examples of the power supply system according to Embodiment 1 to the aircraft. In FIG. 29, the control devices 171 to 176 of the AC wiring portions 31 to 36 are not illustrated. In FIG. 29, similar components to those of FIG. 28 will be denoted by the same reference signs, and description thereof will be omitted. Similar to Application Example 1, in a power supply system 1D of FIG. 29, the VF generators 21 to 24 are connected to the AC wiring portions 31 to 34, and the CF generators 25 and 26 are connected to the AC wiring portions 35 and 36. However, in the present application example, the DC wiring portion 61 is connected to the DC portions of the power conversion devices 41, 43, and 45 to which the AC wiring portions 31, 33, and 35 are connected, and the DC wiring portion 62 is connected to the DC portions of the power conversion devices 42, 44, and 46 to which the AC wiring portions 32, 34, and 36 are connected.

In the present application example, one DC wiring portion 61 and the power conversion devices 41, 43, and 45 connected thereto are arranged in a first power distribution unit S1, and the other DC wiring portion 62 and the power conversion devices 42, 44, and 46 connected thereto are arranged in a second power distribution unit S2. The DC wiring portions 61 and 62 are connected via the bypass circuit 63. In the bypass circuit 63, circuit breakers 110A and 110B are provided on the power distribution units S1 and S2.

In the present application example, the plurality of DC wiring portions 61 and 62 and the power conversion devices 41 to 46 connected thereto can be distributed and arranged for each DC wiring portion. For example, the first power distribution unit S1 is disposed in a front part of the aircraft, and the second power distribution unit S2 is disposed in a rear part of the aircraft.

As the load capacitance of the aircraft is increased, the number of generators 2i is also increased, and as a result, the amount of wirings is also increased. Thus, it is not possible to provide all electronic circuits in one power distribution unit. In the power supply system of the related art, since the bypass circuit that connects the plurality of AC wiring portions is required, even though the power distribution units are divided, the amount of wirings between the plurality of power distribution units cannot be reduced. For example, in order to realize the similar power supply configuration to that of the power supply system 1D of FIG. 29 by the method of the related art, even though only the four AC wiring portions 31 to 34 to which the load 5 is connected are considered, and six lines are required as a bypass route for interconnecting these wiring portions.

In contrast, in the present application example, as illustrated in FIG. 29, the power distribution units S1 and S2 are divided and arranged, and thus, distances distance between the load 5 and the power distribution units S1 and S2 are optimized and the power distribution unit S1 and S2 need only be connected by one bypass circuit 63. Thus, the amount of wirings is reduced. The power conversion devices 45 and 46 corresponding to the generators 25 and 26 are also connected to the DC wiring portions 61 and 62, and thus, the powers of the generators 25 and 26 can be transferred to the load 5 connected to any of the AC wiring portions 31 to 34 without increasing the number of bypass circuits.

Since the wiring between the power distribution units S1 and S2 (the wiring outside the power distribution unit) passes through the inside of an aircraft body, it is necessary to consider the occurrence of the trouble such as disconnection and short circuit. In the present application example, the circuit breakers 110A and 110B are provided at both ends (each of the power distribution units S1 and S2) of the bypass circuit 63. When the trouble occurs in the bypass circuit 63, the bypass circuit 63 is disconnected from both the power distribution units S1 and S2. When the bypass circuit 63 is disconnected, the power interchange cannot be performed between the power distribution units S1 and S2. However, since each of the AC wiring portions 31 to 34 receives the power from two VF generators 21 and 23 or 22 and 24 and one CF generator 25 or 26, sufficient safety can be secured.

As described above, the first power distribution unit S1 is disposed in the front part of the aircraft, and the second power distribution unit S2 is disposed in the rear part of the aircraft. Therefore, even if a trouble occurs in one of the front part and the rear part of the aircraft, the power supply to the loads 5 can be continued by the power distribution unit disposed in the other of the front part and the rear part of the aircraft. Thus, the influence on the power supply system 1D due to the trouble can be reduced.

Application Example 3

FIG. 30 is a block diagram for describing still another one of the application examples of the power supply system according to Embodiment 1 to the aircraft. In FIG. 30, the similar components to those of FIG. 1 will be denoted by the same reference signs, and description thereof will be omitted. In a power supply system 1E according to the present application example, not only the loads 5 are connected to the AC wiring portions 3i (31 and 32), but also the load (DC load) 5D is connected to the DC wiring portion 6.

The active power supplied to the DC load 5D connected to the DC wiring portion 6 is equally shared by the AC wiring portion 3i connected to the DC wiring portion 6. Even in a state in which the DC load 5D is connected to the DC wiring portion 6, the power interchange between the plurality of AC wiring portions 3i is appropriately performed as described above.

Application Example 4

FIG. 31 is a block diagram for describing still another one of the application examples of the power supply system according to Embodiment 1 to the aircraft. In FIG. 31, the similar components to those of FIG. 1 will be denoted by the same reference signs, and description thereof will be omitted. In a power supply system 1F according to the present application example, a power storage facility 13 is connected to the DC wiring portion 6.

A storage battery 13a of the power storage facility 13 is connected to the DC wiring portion 6 via a rectifier circuit 13b including a rectifier such as a diode. A voltage (storage battery voltage) of the storage battery 13a is set to be lower than the voltage fluctuation range during a normal operation of the DC wiring portion 6 (in a state in which the power interchange is performed between the plurality of AC wiring portions 3i). Thus, during the normal operation, the power is not supplied from the storage battery 13a to the DC wiring portion 6. During the normal operation, the storage battery 13a is charged by a charging device 13c connected to the DC wiring portion 6.

When all the generators 2i connected to the DC wiring portion 6 are stopped due to the failure or the like, the DC voltage Vdc is decreased. When the DC voltage Vdc becomes lower than the storage battery voltage, the power from the storage battery 13a is supplied to the DC wiring portion 6 via the rectifier circuit 13b. Thus, the DC voltage Vdc of the DC wiring portion 6 is maintained at the storage battery voltage of the storage battery 13a. The power from the storage battery 13a is supplied to the load 5 connected to each AC wiring portion 3i the DC wiring portion 6 and each power conversion device 4i.

According to the present application example, even when all of the plurality of generators 2i of the power storage facility 13 are stopped, the power supply to each load 5 can be continued by the power storage facility 13. The storage battery 13a of the power storage facility 13 is charged from the generator 2i during the normal operation of the generator 2i. Therefore, a power supply backup function can be provided with a simple configuration.

Although FIGS. 30 and 31 illustrate that the generator 2i is the VF generator, the present invention is not limited there. The configurations of Application Examples 3 and 4 can be applied to a configuration in which the AC wiring portion 3i corresponding to the CF generator and the AC wiring portion 3i corresponding to the VF generator are connected to the DC wiring portion 6 as in Embodiment 2 and Application Example 5.

Application Example 5

FIG. 32 is a block diagram for describing one of application examples of the power supply system according to Embodiment 2 to the aircraft. In FIG. 32, the control devices 171 to 176 of the AC wiring portions 31 to 36 are not illustrated. In FIG. 32, the similar components to those of FIGS. 23 and 29 will be denoted by the same reference signs, and description thereof will be omitted. In a power supply system 1G of FIG. 32, the CF generators (second generators) 20B and 20A are connected to the AC wiring portions (second AC wiring portions) 32 and 33 instead of the VF generators 22 and 23 according to Application Example 1. As described in Embodiment 2, the power conversion devices 42 and 43 connected to the AC wiring portions 32 and 33 are controlled by using the target value of the second control element decided such that the relationship of the frequencies fac of the AC wiring portions 32 and 33 with respect to the power conversion device active power Pac has the predetermined fourth drooping characteristic.

In the present application example, the DC loads 5D are connected to the DC wiring portions 61 and 62. An operation of the power supply system 1G performed by connecting the DC load 5D is similar to that of the power supply system 1E according to Application Example 3.

In accordance with the power supply system 1G according to the present application example, it is possible to perform the interchange of the power between the VF generators 21 and 24 and the CF generators 20B and 20A as described in Embodiment 2. Since the variable-frequency AC power supply system (AC wiring portions 31 and 34), the constant-frequency AC power supply system (AC wiring portions 32 and 33), and the DC power supply system (DC wiring portions 61 and 62) can be used, it is possible to select the power supply BUS to be connected according to the characteristics of the loads 5 and 5D. Accordingly, a more efficient device configuration can be obtained.

In the present application example, the power conversion devices 41 and 44 corresponding to the VF generators 21 and 24 and the power conversion devices 43 and 42 corresponding to the CF generators 20A and 20B are arranged one by one in one of the power distribution units S1 and S2. Accordingly, even though the trouble occurs in one of the power distribution units S1 and S2, the power supply to the loads 5 and 5D having different characteristics can be continued. However, instead, the VF generators 21 and 24 and the corresponding power conversion devices 41 and 44 may be arranged in one of the distribution units, and the CF generators 20A and 20B and the corresponding power conversion devices 43 and 42 may be arranged in the other distribution unit.

Other Modification Examples

Although the embodiments of the present invention have been described, the present invention is not limited to the aforementioned embodiments, various improvements, changes, and modifications can be made without departing from the gist of the present invention.

For example, although it has been described in the aforementioned embodiments that the AC wiring portion 3i to which the power supply system is applied is the three-phase system, the present invention is not limited thereto. For example, even when the AC wiring portion 3i is a single-phase two-wire system or a single-phase three-wire system, the similar power supply system can be constructed except that various calculation methods are different depending on the system type.

Although it has been described in the aforementioned embodiments that one generator 2i is connected to one AC wiring portion 3i, two or more generators 2i may be connected to one AC wiring portion 3i.

Various embodiments can be adopted as the number of AC wiring portions 3i in the power supply system, the type of the generator 2i (the CF generator, the VF generator, the generator using the power of the main engine, the generator using the power of the auxiliary power unit and the like) connected to each AC wiring portion 3i, and the control mode thereof (the same control mode as that of the VF generator illustrated in FIG. 2 or a different control mode illustrated in FIG. 8) in the configuration including provided with a CF generator, and the number of DC wiring portions 6.

The power supply systems according to the aforementioned application examples may be constituted independently from each other, or may be constituted by appropriately combining the plurality of application examples.

Although it has been described in the aforementioned application examples that the power supply system can be mainly applied to the aircraft or a hybrid propulsion ship, the power supply system according to the aforementioned embodiments can be desirably applied as long as the power supply system includes the plurality of generators. For example, the power supply system according to the aforementioned embodiments can be applied to a mobile power supply system such as a normal ship and a distributed power generation system.

INDUSTRIAL APPLICABILITY

The present invention is useful to continue to supply a power to each wiring portion even when an abnormality occurs in one generator in a power supply system in which a plurality of wiring portions each including at least one generator is interconnected.

REFERENCE SIGNS LIST 1, 1B power supply system
2i(i=1, 2, . . . ) generator
3i AC wiring portion
4i power conversion device
6, 61, 62 DC wiring portion
17i, 170, 170A, 170B control device
20, 20A, 20B constant-frequency generator (CF generator)
70 phase calculation unit
77 active power target value calculation unit

The invention claimed is:

1. A power supply system including a plurality of generators, the system comprising:
a plurality of AC wiring portions that is connected to the plurality of generators;
a plurality of power conversion devices that is connected to the plurality of AC wiring portions;
a DC wiring portion that connects the plurality of power conversion devices; and
a control device that performs power conversion control between a corresponding AC wiring portion and the DC wiring portion by transmitting a drive signal to the plurality of power conversion devices,
wherein at least one of the plurality of generators is a first generator configured such that a relationship of a generator output voltage with respect to a generator active power output from the generator to a corresponding first AC wiring portion has a predetermined first drooping characteristic,
each of the plurality of power conversion devices is configured to convert an AC power input via each AC wiring portion into a DC power, and convert a DC power input via the DC wiring portion into an AC power, and
the control device is configured to generate the drive signal for the power conversion device by deciding a target value of a first control element such that a relationship of an AC wiring portion voltage with respect to a power conversion device active power output from the power conversion device to the first AC wiring portion corresponding to the first generator has a predetermined second drooping characteristic and correcting the target value of the first control element according to the DC voltage at the DC wiring portion.

2. The power supply system according to claim 1,
wherein the control device includes an active power target value calculation unit that calculates an active power target value by active power target value calculation processing including calculation for receiving the AC wiring portion voltage of the first AC wiring portion and obtaining an active power reference value obtained by multiplying a value based on a deviation of the AC wiring portion voltage from a predetermined voltage command value by a coefficient indicating the second drooping characteristic.

3. The power supply system according to claim 2,
wherein the control device includes a phase calculation unit that receives the generator output voltage of the first generator and the AC wiring portion voltage at the first AC wiring portion corresponding to the first generator, and calculates a phase target value of the first AC wiring portion corresponding to the first generator, and
the control device is configured to receive an AC current of the first AC wiring portion, generate a pair of AC current target values by the active power target value and a predetermined reactive power command value, set a target value of the AC current output to the first AC wiring portion to the AC current target value, and generate the drive signal for matching a phase of the AC current with the phase target value.

4. The power supply system according to claim 2,
wherein the active power target value calculation unit is configured to calculate an active power correction value obtained by multiplying a deviation of the DC voltage from a predetermined DC voltage command value by a predetermined correction coefficient, and calculate the active power target value by adding the active power reference value and the active power correction value to a predetermined active power command value.

5. The power supply system according to claim 3,
wherein the phase calculation unit is configured to output a predetermined value as the phase target value when the first generator is stopped, calculate the phase target value by using a generator voltage of the corresponding first generator when the first generator and the corresponding first AC wiring portion are disconnected, and calculate the phase target value by using the AC wiring portion voltage at the first AC wiring portion when the first generator and the corresponding first AC wiring portion are interconnected.

6. The power supply system according to claim 1,
wherein the first generator includes a variable-frequency generator which is connected to a rotator and in which a frequency of a generated power is changed according to a rotational speed of the rotator.

7. The power supply system according to claim 1,
wherein at least one of the plurality of generators is a second generator configured such that a relationship of a frequency with respect to the generator active power output from the generator to a corresponding second AC wiring portion has a predetermined third drooping characteristic, and
the control device is configured to generate the drive signal for the power conversion device by deciding a target value of a second control element such that a relationship of the frequency with respect to the power conversion device active power output from the power conversion device to the second AC wring portion corresponding to the second generator has a predetermined fourth drooping characteristic and correcting the target value of the second control element according to the DC voltage at the DC wiring portion.

* * * * *